(12) United States Patent
Yoon et al.

(10) Patent No.: US 8,229,499 B2
(45) Date of Patent: Jul. 24, 2012

(54) ENHANCEMENTS FOR MULTI-MODE SYSTEM SELECTION (MMSS) AND MMSS SYSTEM PRIORITY LISTS (MSPLS)

(75) Inventors: Young Cheul Yoon, San Diego, CA (US); Srinivasan Balasubramanian, San Diego, CA (US); Shyamal Ramachandran, San Diego, CA (US); Arvind Swaminathan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 12/839,106

(22) Filed: Jul. 19, 2010

(65) Prior Publication Data

US 2011/0014913 A1  Jan. 20, 2011

Related U.S. Application Data

(60) Provisional application No. 61/226,991, filed on Jul. 20, 2009.

(51) Int. Cl.
G06F 15/16  (2006.01)
(52) U.S. Cl. .................. 455/552.1; 455/456.1
(58) Field of Classification Search ............ 455/456.1, 455/456.3, 552.1; 342/450, 453, 457
See application file for complete search history.

(56) References Cited

U.S. PATENT DOCUMENTS

| | | | |
|---|---|---|---|
| 6,529,491 B1 | 3/2003 | Chang et al. | |
| 2006/0282554 A1 | 12/2006 | Jiang et al. | |
| 2008/0182615 A1 | 7/2008 | Xue et al. | |
| 2009/0313041 A1* | 12/2009 | Eder | 705/2 |

FOREIGN PATENT DOCUMENTS

| | | |
|---|---|---|
| EP | 1740001 | 1/2007 |
| EP | 1885141 A1 | 2/2008 |
| WO | WO03067917 | 8/2003 |
| WO | WO03100647 A1 | 12/2003 |
| WO | WO2007127323 | 11/2007 |

OTHER PUBLICATIONS

3GPP TR 22.811: "Review of Network Selection Principles" Technical Specification, Jun. 1, 2006, XP040276844 p. 6, lines 18-20 p. 10, line 2.
International Search Report and Written Opinion—PCT/US2010/042659, International Search Authority—European Patent Office—Nov. 5, 2010.
Preferred Roaming List for Multi-mode Terminal 3GPP Draft; SP-030766, 3rd Generation Partnership Project (3GPP), Mobile Competence Centre ; 650, Route Des Lucioles ; F-06921 Sophia-Antipolis Cedex ; France, vol. TSG SA, No. Maui; 20031216, Dec. 16, 2003, XP050200898.

* cited by examiner

*Primary Examiner* — Sam Bhattacharya
(74) *Attorney, Agent, or Firm* — Darren M. Simon

(57) ABSTRACT

A mobile device or access terminal of a wireless wide area network (WWAN) communication system is provisioned for Multi-Mode System Selection (MMSS) wherein an MMSS System Priority List (MSPL) is used with respect to the underlying system selection priority list (e.g., Private Land Mobile Network (PLMN) list). Relating a current location to one or more entries in an MMSS Location Associated Priority List (MLPLs) enables scaling a range of entries in the PLMN list, indicating whether the MSPL apply to the entire list of PLMNs stored in an access terminal or to some subset of the PLMN List. Similarly, the present innovation addresses whether the MSPL applies to the entire Preferred Roaming List (PRL) or some subset of a geo-spatial location (GEO) area.

37 Claims, 9 Drawing Sheets

ENHANCEMENTS FOR MULTI-MODE SYSTEM SELECTION (MMSS) AND MMSS SYSTEM PRIORITY LISTS (MSPLS)

CLAIM OF PRIORITY UNDER 35 U.S.C. §119

The present application for patent claims priority to Provisional Application No. 61/226,991 entitled "MMSS Enhancements" filed 20 Jul. 2009, and assigned to the assignee hereof and hereby expressly incorporated by reference herein.

REFERENCE TO CO-PENDING APPLICATIONS FOR PATENT

The present application for patent is related to the following co-pending U.S. patent applications:

U.S. patent application Ser. No. 12/423,520 by Yoon et al., entitled "Preferred System Selection Enhancements for Multi-Mode Wireless Systems", filed Apr. 14, 2009, published Jan. 21, 2010 as 20100015978 A1, assigned to the assignee hereof, and expressly incorporated by reference herein.

BACKGROUND

1. Field

The present disclosure relates generally to wireless voice communication, and more specifically to techniques for system selection in a wireless communication environment.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Universal Mobile Telecommunications System (UMTS) is one of the third-generation (3G) cell phone technologies. UTRAN, short for UMTS Terrestrial Radio Access Network, is a collective term for the Node-B's and Radio Network Controllers which make up the UMTS radio access network. This communications network can carry many traffic types from real-time Circuit Switched to IP based Packet Switched. The UTRAN allows connectivity between the UE (user equipment) and the core network. The UTRAN contains the base stations, which are called Node Bs, and Radio Network Controllers (RNC). The RNC provides control functionalities for one or more Node Bs. A Node B and an RNC can be the same device, although typical implementations have a separate RNC located in a central office serving multiple Node B's. Despite the fact that they do not have to be physically separated, there is a logical interface between them known as the Iub. The RNC and its corresponding Node Bs are called the Radio Network Subsystem (RNS). There can be more than one RNS present in an UTRAN.

CDMA2000 (also known as IMT Multi Carrier (IMT MC)) is a family of 3G mobile technology standards, which use CDMA channel access, to send voice, data, and signaling data between mobile phones and cell sites. The set of standards includes: CDMA2000 1x, CDMA2000 EV-DO Rev. 0, CDMA2000 EV-DO Rev. A, and CDMA2000 EV-DO Rev. B. All are approved radio interfaces for the ITU's IMT-2000. CDMA2000 has a relatively long technical history and is backward-compatible with its previous 2G iteration IS-95 (cdmaOne).

CDMA2000 1x (IS-2000), also known as 1x and 1xRTT, is the core CDMA2000 wireless air interface standard. The designation "1x", meaning 1 times Radio Transmission Technology, indicates the same RF bandwidth as IS-95: a duplex pair of 1.25 MHz radio channels. 1xRTT almost doubles the capacity of IS-95 by adding 64 more traffic channels to the forward link, orthogonal to (in quadrature with) the original set of 64. The 1x standard supports packet data speeds of up to 153 kbps with real world data transmission averaging 60-100 kbps in most commercial applications. IMT-2000 also made changes to the data link layer for the greater use of data services, including medium and link access control protocols and Quality of Service (QoS). The IS-95 data link layer only provided "best effort delivery" for data and circuit switched channel for voice (i.e., a voice frame once every 20 ms).

CDMA2000 1xEV-DO (Evolution-Data Optimized), often abbreviated as EV-DO or EV, is a telecommunications standard for the wireless transmission of data through radio signals, typically for broadband Internet access. It uses multiplexing techniques including code division multiple access (CDMA) as well as time division multiple access (TDMA) to maximize both individual user's throughput and the overall system throughput. It is standardized by 3rd Generation Partnership Project 2 (3GPP2) as part of the CDMA2000 family of standards and has been adopted by many mobile phone service providers around the world, particularly those previously employing CDMA networks.

3GPP LTE (Long Term Evolution) is the name given to a project within the Third Generation Partnership Project (3GPP) to improve the UMTS mobile phone standard to cope with future requirements. Goals include improving efficiency, lowering costs, improving services, making use of new spectrum opportunities, and better integration with other open standards. The LTE system is described in the Evolved UTRA (EUTRA) and Evolved UTRAN (EUTRAN) series of specifications.

Dual mode (or multimode) mobiles refer to mobile phones that are compatible with more than one form of data transmission or network, as contrasted with single-mode mobiles. For instance, a dual-mode phone can be a telephone which uses more than one technique for sending and receiving voice and data. This could be for wireless mobile phones or for wired phones.

In one aspect, the dual mode can refer to network compatibility, such as mobile phones containing two types of cellular radios for voice and data. These phones include combination of GSM and CDMA technology. They can be used as a GSM or CDMA phone according to user preference. These handsets are also called global phones and are essentially two phones in one device. For this particular example of a dual mode cdma2000 and GSM phone, there are two possibilities, either two cards (R-UIM and SIM) or one card (SIM-only)

where the R-UIM information is stored in the Mobile Equipment (handset shell). In an exemplary use, consider a LTE+ cdma2000 terminal that could be outfitted with the next generation smart card known as: UICC (Universal Integrated Circuit Card). The UICC would contain a USIM application (essentially a SIM for LTE) and a CSIM application (in place of the R-UIM cdma2000 card).

Conventionally, system selection in a wireless communication environment is based on priority lists, which list the preferred order in which a terminal is to attempt access to systems in a geographic area. However, such priority lists are generally associated with particular access technologies and/ or sets of access technologies (e.g., based on communication standards), and contain formatting and information that are particular to the technologies and/or sets of technologies to which the lists correspond. As a result, a multi-mode terminal can be presented with multiple priority lists corresponding to different radio technologies, each of which contain different formatting and/or sets of information. This can, in turn, lead to difficulty and/or inefficiency in selecting a system from among a group of systems utilizing different access technologies. Accordingly, it would be desirable to implement techniques for multi-mode wireless system selection that mitigate at least the above shortcomings.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In one aspect, a method is provided for multi-mode system selection in a wireless wide area network. A current geo-spatial location coverage region is determined. A subset of system selection location priority lists is determined based upon the current geo-spatial location coverage region. Entries are scaled down in underlying system selection information by mapping the subset of system selection location priority lists to a set of associated system priority information. An available access node is selected in accordance with a radio access technology that is selected according to the system selection priority list. A mobile device communicates over an air-interface with the available access node.

In another aspect, at least one processor is provided for multi-mode system selection in a wireless wide area network. A first module determines a current geo-spatial location coverage region. A second module selects a subset of system selection location priority lists based upon the current geo-spatial location coverage region. A third module scales down entries in underlying system selection information by mapping the subset of system selection location priority lists to a set of associated system priority information. A fourth module selects an available access node in accordance with a radio access technology that is selected according to the system selection priority list. A fifth module communicates over an air-interface with the available access node.

In an additional aspect, a computer program product is provided for multi-mode system selection in a wireless wide area network. A non-transitory computer-readable storage medium comprises sets of codes. A first set of codes causes a computer to determine a current geo-spatial location coverage region. A second set of codes causes the computer to select a subset of system selection location priority lists based upon the current geo-spatial location coverage region. A third set of codes causes the computer to scale down entries in underlying system selection information by mapping the subset of system selection location priority lists to a set of associated system priority information. A fourth set of codes causes the computer to select an available access node in accordance with a radio access technology that is selected according to the system selection priority list. A fifth set of codes causes the computer to communicate over an air-interface with the available access node.

In a further aspect, an apparatus is provided for multi-mode system selection in a wireless wide area network. Means are provided for determining a current geo-spatial location coverage region. Means are provided for selecting a subset of system selection location priority lists based upon the current geo-spatial location coverage region. Means are provided for scaling down entries in underlying system selection information by mapping the subset of system selection location priority lists to a set of associated system priority information. Means are provided for selecting an available access node in accordance with a radio access technology that is selected according to the system selection priority list. Means are provided for communicating over an air-interface with the available access node.

In yet another aspect, an apparatus is provided for multi-mode system selection in a wireless wide area network. A computing platform determines a current geo-spatial location coverage region, selects a subset of system selection location priority lists based upon the current geo-spatial location coverage region, scales down entries in underlying system selection information by mapping the subset of system selection location priority lists to a set of associated system priority information, and selects an available access node in accordance with a radio access technology that is selected according to the system selection priority list. A transceiver communicates over an air-interface with the available access node.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
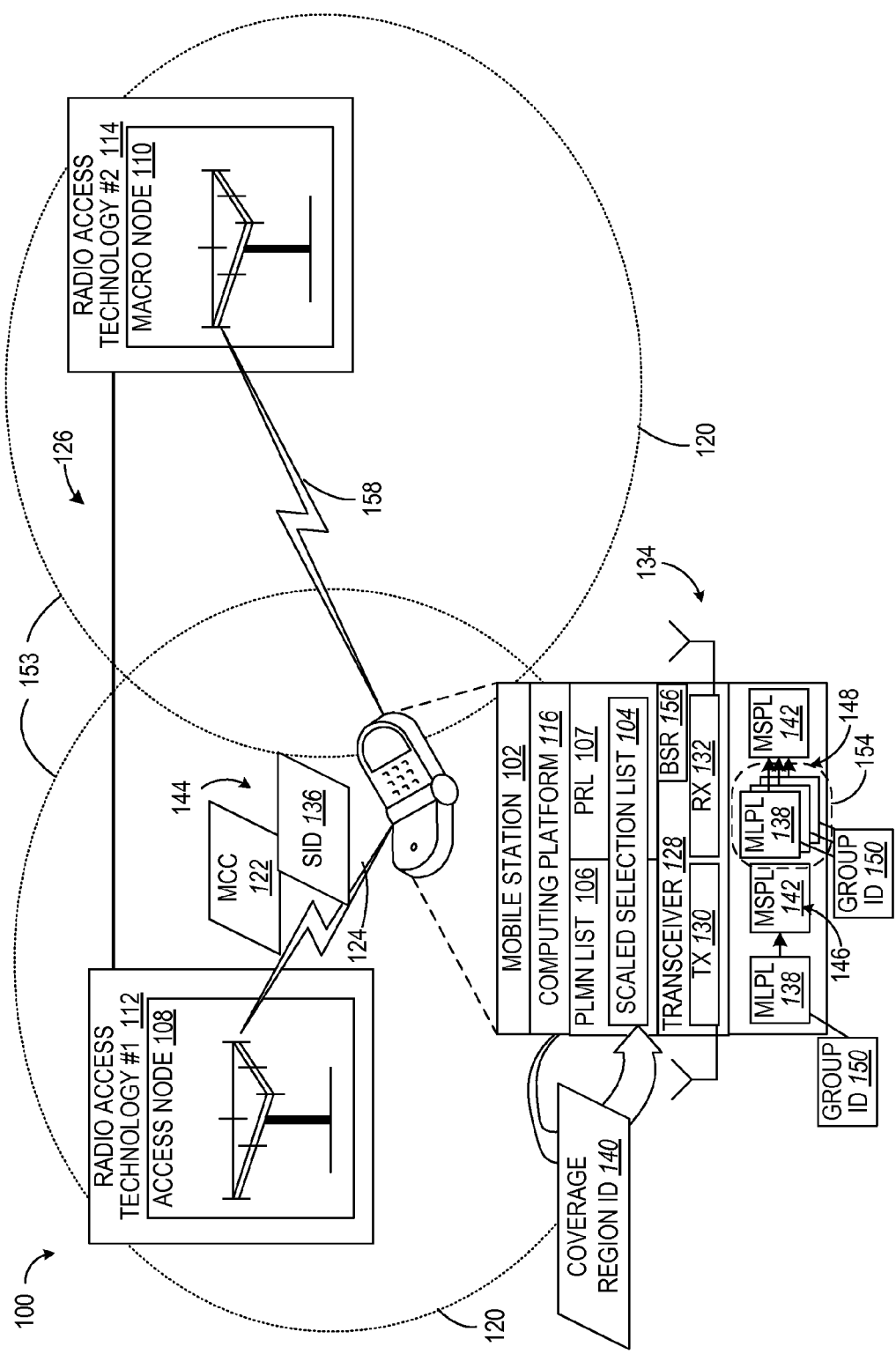
FIG. 1 illustrates a schematic diagram of a communication system that performs Multi-Mode System Selection (MMSS).

Presently for Multi-Mode System Selection (MMSS), an MMSS System Priority List (MSPL) is used with respect to the underlying two or more system selection priority lists (e.g., 3GPP's Private Land Mobile Network (PLMN) system selection priority list and cdma2000's Preferred Roaming List (PRL)). There is a need to specify the range of entries in the underlying system selection list to which the MSPL applies. In other words, the present innovation addresses whether the MSPL applies to the entire list of PLMNs stored in an access terminal or to some subset of the PLMN List. Similarly, the present innovation addresses whether the MSPL applies to the entire Preferred Roaming List (PRL) or some subset of a geo-spatial location (GEO) area.

In particular, the present innovation describes enhancements for Over-the-Air Service Provisioning (OTASP) for spread spectrum systems, in particular for MMSS that enables a terminal to select a radio access technology (RAT) or system amongst a number of candidates. These candidates span 3GPP RATs (e.g., LTE, UMTS or GSM), 3GPP2 RATs (e.g., 1× or HRPD) or others from other standards bodies.

A set of parameters that support MMSS include (1) a subset for MMSS System Priority Lists (MSPL) that define relative priorities of the various RATs among the various technologies (3GPP, 3GPP2, WiMAX, etc). The set of parameters that support MMSS also and include (2) a subset of MMSS Location Associated Priority Lists (MLPL) that define a coverage region based on Mobile Country Code (MCC), Mobile Network Code (MNC), System Identifier (SID), Node Identifier (NID) and in some instances other system identifiers. The MLPL also points to a particular MSPL which applies to this coverage region.

As examples, first consider the Priority_Class parameter in MSPL for 3GPP systems. Currently, Priority_Class #2 (Preferred Class) appears to be included in all entries in the Operator PLMN (OPLMN) and User PLMN (UPLMN). However, this is unnecessary since there could be many entries that are not applicable. For example, if a user were in Japan, there is no need for the MSPL to apply to entries outside of Japan. PLMN entries with "MCC=Japan" would only be relevant. For another example, if a user were in an area that borders two or more countries, PLMN entries for two or more countries (based on two or more MCCs) would only need to be considered. For an additional example, if a user were in an area better defined by both MCC and MNC(s) (e.g. the U.S.) then those PLMN entries with those MCC and MNCs need only be considered. Thus, the MSPL Preferred Priority_Class parameter would only need to be applied to these subsets of the PLMN for each example.

Second, consider the System_Type parameter in MSPL for 3GPP systems. Currently, System_Type appears to be applicable to the entire PLMN list. System_Type defines an umbrella of systems from a particular technology (e.g., 3GPP Air Interfaces) or a specific RAT (e.g. LTE or GSM). However, applying System_Type to the entire PLMN list is unnecessary since there could be many entries that are not applicable. For the previously given examples, the MSPL System_Type need only be applied to entries limited to, respectively, Japan, two or more countries or a set of MCC/MNC(s). If a user were in an area that borders two or more countries, PLMN entries for two or more countries (e.g., based on two or more MCCs) would only need to be considered.

Third, it should be appreciated with the benefit of the present disclosure that similar issues arise for 3GPP2. For instance, a question can exist as to whether the MSPL apply to the entire Preferred Roaming List (PRL) or a subset of GEOs identified by a MCC, MCC/MNC(s), or SID/NID(s) or Subnet ID.

In answer thereto, the present innovation discloses a wireless communication system that facilitates service selection for a mobile device by creating an appropriate subset of a selection list. In an exemplary aspect, a Wireless Wide Area Network (WWAN) is disclosed wherein mobile devices are provisioned with a subset of an underlying selection list with several exemplary approaches to interpreting parameters in MSPL accordingly.

Various aspects are described herein in connection with a mobile device. A mobile device can also be called a system, a subscriber unit, a subscriber station, mobile station, mobile, mobile device, cellular device, multi-mode device, remote station, remote terminal, access terminal, user terminal, user agent, a user device, or user equipment, or the like. A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In addition, various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

With initial reference to FIG. 1, a communication system 100 enables a mobile device, mobile station (MS) or access terminal (AT) 102 to scale down an underlying selection list ("scaled selection list") 104 rather than having to use an entire selection list (e.g., PLMN list) 106. A Preferred Roaming List (PRL) 107 can also be part of the underlying selection list since MMSS generally contemplates more than one system selection list. Thereby, an appropriate radio access node 108, 110 can be selected according a preferred or appropriate Radio Access Technology (RAT) 112, 114 for a particular geographic location.

It should be appreciated with the benefit of the present disclosure that PRL 107 can be a PRL as conventionally understood for 1× systems or an Extended PRL that is generally understood for 1× and HRPD systems.

In a first version, a computing platform 116 of the AT 102 scales down the underlying selection list based upon a determination of what coverage region 120 that the AT 102 is in. The computing platform 116 can receive a Mobile Country Code (MCC) 122 broadcast over a WWAN air-interface 124 by a network 126, specifically the access node 108. The AT 102 uses a transceiver 128 of transmitter(s) ("Tx") 130 and receiver(s) ("Rx") 132 using one or more antennas 134 to communicate over the WWAN air-interface 124. Alternatively, the computing platform 116 can receive a System Identifier (SID) 136 broadcast over by the access node 108 that the computing platform 116 can use to select a locally stored MCC cross reference data structure (e.g., MLPL) 138. In an exemplary aspect, coverage region identification 140 is used to access an appropriate MLPL 138 which in turn points to an MSPL 142. This coverage region identification 140 can be based on some combination of network information 144 of MCC, MNC(s), SID and Network Identifiers (NIDs) and possibly other identifiers (e.g. Subnet ID needed to identify HRPD systems).

In one aspect, one-to-one mapping of an MLPL 138 to MSPL 142 is used as depicted at 146. Alternatively or in addition, many-to-one mapping of MLPLs 138 to MSPL 142 is used as depicted at 148. Although the MLPL 138 is not as clearly referenced, the AT 102 can determine the appropriate MLPL 138 since the AT 102 can read from the network 126 the MCC 122, or other network information 144.

In an exemplary aspect, it should be appreciated with the benefit of the present disclosure first that the MLPL Database or MLPL in short contains multiple individual MLPL entries. Each MLPL entry points to a particular MSPL entry. Likewise, there is a single MSPL which houses multiple MSPL entries. Second, the mapping can be determined by reading the MLPL entry. The MLPL entry contains a field called "MSPL_INDEX" which basically points the MLPL entry to a particular MSPL entry.

In a second version, a generalization of the first version implements an MLPL Grouping ID 150 that groups together one or more MLPLs 138 to form a larger coverage region that can be used instead.

In a third version, a further generalization without a particular grouping identifier can be achieved by having an expanded coverage region 153, represented by an expanded MLPL 154 defined by more than one combination of multiple MCCs, MNCs and/or multiple SIDs, NIDs and/or multiple Subnet IDs. Conceptually, thus, the MLPL Grouping ID 150 becomes subsumed by this general MLPL design.

Alternatively or in addition, a periodic Better Service Reselection (BSR) component 156 can be limited to scanning for systems of a different radio access technology 114 only, depicted at 158. For example, if the access terminal 102 is camped on GSM, BSR component 156 only scans for non-3GPP systems.

In an exemplary aspect, the access terminal 102 implements the second version with the MLPL Grouping ID 150 as well as possibly aspects of the other versions. If MLPL Grouping ID 150 was not implemented, than an alternative exemplary aspect would utilize the approach of an MLPL 138 which points to the MSPL 142 of version 1. Thus, the MLPL 138 in which the terminal is located scales down the underlying selection list.

Thus, an apparatus depicted as the access terminal 102 can support multi-mode system selection in a wireless wide area network 126. To that end, the computing platform 116 determines a current geo-spatial location coverage region 120, 153 and selects a subset of system selection location priority lists, depicted as selected MLPLs 138, 154, based upon the current geo-spatial location coverage region 120, 153. The computing platform 116 scales down entries in underlying system selection information by mapping the subset of system selection location priority lists to a set of associated system priority information, and selecting an available access node 108 in accordance with the RAT 112 that is selected according to the system selection priority list. The transceiver 128 communicates over the air-interface 124 with the available access node 108, 110.

By virtue of the foregoing, one of ordinary skill in the art with the benefit of the present disclosure should appreciate that the present innovation:

removes ambiguity in determining which subset of the underlying selection list entries the MSPL applies to, provides a general way to define the subset, and allows MSPL's Priority_Class and System_Type parameters to be used more effectively. Use of the latter would otherwise become ineffective when the entire PLMN list 106 is used.

In implementing this scaling of the system selection, aspects of structuring and interpreting the MSPL 142 can be made.

First, inclusion of additional System Types in the MSPL can be allowed to enable indication of individual air-interfaces (e.g. LTE, GSM, UMTS, 1×, DO). Thereby, operators and networks can support more flexible interleaving and prioritizing across the air-interfaces of different Standards. The following are two examples:

LTE>DO>UMTS>1×>GSM     Example 1.

LTE(MNC_1)>DO(Subnet_1)>LTE(MNC_2)>DO
   (Subnet_2)>UMTS(MNC_2)>1×(NID_1)>
   GSM(MNC_2)     Example 2.

Second, support for listing consecutive System Types from a particular Standard can be expressly allowed as a special case. Thereby, a PLMN list entry can be handled that has no access technology (AcT) or that has two or more AcTs indicated in the AcT bitmap. The MSPL 142 could then spell out the relative priority of the various AcTs for such a PLMN list.

LTE>UMTS>GSM>cdma2000     Example 3.

where the LTE, UMTS and GSM refer to:

a common single PLMN entry;

two entries where one entry has two AcTs indicated ordered consistent with the PLMN list; or three entries where each entry has one AcT indicated ordered consistently with the PLMN list.

Third, clarification of the scope of MSPL can be implemented. Presently, it is not clear if the MSPL 142 (e.g., Priority Class, Sys_Types) applies to the entire set of PLMNs listed in the card (HPLMN, EHPLMN, OPLMN, etc) or some subset. By limiting the scope of the MSPL 142 to the subset of systems defined by the MLPL 138 or a 'group' of MLPLs 138 sharing a common MLPL_GROUPING_ID 150 (i.e., each MLPL 138 in this group can point to the same MSPL 142). This would clarify the applicability and scope of Priority Classes and System Types, making it clear that they apply to the subset rather than the entire set of systems of a technology. The MLPL_GROUPING_ID 150 would handle the situation the scope of a single MLPL were insufficient (e.g., where multiple MCCs or multiple SIDs were required).

Examples with a single MLPL where MLPL_1 points to MSPL_1:

If MLPL_1 contains MCC_1, then MSPL_1 applies to the subset of PLMN entries and PRL entries with MCC_1

If MLPL_1 contains MCC_1, MNC_1 to MNC_4 then MSPL_1 applies to the subset of PLMN entries with MCC_1, MNC_1 to MNC_4 and the subset of GEO(s) in a PRL with MCC_1.

If MLPL_1 contains SID_1, NID_1 to NID_7 then MSPL_1 applies to the subset of GEO(s) in a PRL with SID_1, NID_1 to NID_7.

If MLPL_1 contains MCC_1, SID_1, NID_1 to NID_7 then MSPL_1 applies to the subset of PLMNs w/MCC_1 and GEO(s) in a PRL with MCC_1, SID_1, and NID_1 to NID_7.

Examples with MLPL_GROUPING_ID where MLPL_1 and MLPL_2 share a common MLPL_GROUPING_ID and each point to MSPL_1:

If MLPL_1 contains MCC_1 and MLPL_2 contains MCC_2 then MSPL_1 applies to the subset of PLMN entries with either MCC_1 or MCC_2.

If MLPL_1 contains MCC_1, MNC_1 to MNC_4 and MLPL_2 contains MCC_2, MNC_7 to MNC_9 then MSPL_1 applies to the subset of PLMNs with either MCC_1, MNC_1 to MNC_4 or MCC_2, MNC_7 to MNC_9.

If MLPL_1 contains SID_1, NID_1 to NID_7 and MLPL_2 contains SID_2, NID_8 to NID_9, then MSPL_1 applies to the subset of GEO(s) in a PRL with SID_1, NID_1 to NID_7 or SID_2, NID_8 to NID_9.

If MLPL_1 contains MCC_1, SID_1, NID_1 to NID_7 and MLPL_2 contains MCC_2, SID_2, then MSPL_1 applies to the subset of PLMN entries with MCC_1 or MCC_2 and GEO(s) in a PRL with MCC_1, SID_1, and NID_1 to NID_7 or MCC_2.

Fourth, addition of informative text can be provided recommending the specification of all relative priorities between cross-technologies (e.g., 3GPP PLMN entries and 3GPP2 PRL entries). This would avoid any ambiguity of their relative priorities. Essentially, this can be taken care of by making sure that the "ANY" Priority_Class is used at the end of an MSPL to define the priorities of all remaining systems.

In an exemplary aspect, definitions and informative text for MLPL can enhanced with descriptions for MLPL_GROUPING_ID. In addition, definitions and informative text for MMSS SYSTEM PRIORITY LIST (MSPL) can be enhanced with descriptions for MSPL with System_Types.

MMSS Location Associated Priority List (MLPL): The MLPL is a list of groupings based on location specific information. MLPL allows the base station to specify the MMSS System Priority List to be used in a location grouping. Different types of location groupings are specified in Table C. Each entry in the MLPL points to an MSPL.

TABLE A

| Field | Length (bits) |
| --- | --- |
| MLPL_SIZE | 16 |
| MLPL_ID | 4 |
| NUM_MLPL_RECS | 4 |

NUM_MLPL_RECS are occurrences of the following:

TABLE B

| MLPL_GROUPING_ID | 12 |
| --- | --- |
| RESERVED | 4 |
| LOC_PARAM_TYPE | 8 |
| LOC_PARAM_VAL | Variable |
| MSPL_INDEX | 8 |

MLPL_SIZE is the location associated priority list size. This field is set to the total size, in octets, of the MLPL, including the MLPL_SIZE.

MLPL_ID is the MMSS Location Priority List identification and provides a unique identification for the MLPL assigned by the base station.

NUM_MLPL_RECS is the number of overlay system priority records. This field is set to the number of entries in the MLPL.

MLPL_GROUPING_ID is the MMSS Location Associated Priority List Grouping ID. This field is set to a value to group multiple MLPLs with a common MLPL_GROUPING_ID. The value '0000 0000 0000' and '1111 1111 1111' shall be reserved; All MLPLs which share a common MLPL_GROUPING_ID (other than the reserved values) shall point to the same MSPL.

LOC_PARAM_TYPE is the Location Parameter Type. This field identifies the parameter used for Location grouping. Possible parameters are described in Table C. The location parameter type can be specified as any combinations of MCC, MNC and TAG_ID. When bits 0, 1, and 2 are all set to '0' the 'Default' type shall be used. The 'Default' type represents the case when no location information is available to the device. The 'TAG_ID' bit specifies the location grouping to which this MLPL record belongs.

LOC_PARAM_TYPE:

TABLE C

| Bit | LOC_PARAM_TYPE Description |
| --- | --- |
| Bit 7 | Reserved |
| Bit 6 | Reserved |
| Bit 5 | Reserved |
| Bit 4 | Reserved |
| Bit 3 | Reserved |
| Bit 2 | NUM_SYS_LOC_TAG specified 'XXXXX1XX'; NUM_SYS_LOC_TAG 'XXXXX0XX' |
| Bit 1 | MNC specified 'XXXXXX1X'; MNC not specified 'XXXXXX0X' |
| Bit 0 | MCC specified 'XXXXXXX1'; MCC not specified 'XXXXXXX0' |

LOC_PARAM_VAL is the Location Parameter Value. This field is variable in length, depending on the LOC_PARAM_TYPE used for location grouping. The length of LOC_PARAM_VAL for each LOC_PARAM_TYPE is described in Table D.

TABLE D

| LOC_PARAM_TYPE | LOC_PARAM_VAL (Length in bytes) |
| --- | --- |
| MCC | 0 or 3 |
| MNC | 0 or 2 |
| NUM_SYS_LOC_TAG | 1 |

NUM_SYS_LOC_TAG is occurrences of the following fields:

TABLE E

| SYS_TYPE | 1 |
| --- | --- |
| SYS_LOC_TAG_SIZE | 1 |
| SYS_LOC_TAG | variable |

MCC is Mobile Country Code. If Bit 0 of LOC_PARAM_TYPE is set to '1', this field shall be included and shall be set to the Mobile Country Code; otherwise this field shall be omitted.

MNC is Mobile Network Code. If Bit 1 of LOC_PARAM_TYPE is set to '1', this field shall be included and shall be set to the Mobile Network Code; otherwise this field shall be omitted.

NUM_SYS_LOC_TAG: If Bit 2 of LOC_PARAM_TYPE is set to '1', this field shall be set to the number of system location information applicable to this LOC_PARAM_VAL; otherwise this field shall be omitted.

SYS_TYPE: This field shall be set to the system type specified in table H.

SYS_LOC_TAG SIZE: Size in octets of SYS_LOC_TAG.

SYS_LOC_TAG: This field shall be set according to the system record associated with the system type specified in SYS_TYPE.

If SYS_TYPE is set to '00000000' (cdma2000), the SYS_LOC_TAG can consist of the following three fields:

TABLE F

| cdma2000 System Location Tag | Length in bytes |
|---|---|
| SID | 2 |
| NID_START | 2 |
| NID_RANGE | 1 |

SID is a number uniquely identifying a wireless system in cdma2000.

NID_START specifies the first NID value from the cdma2000 PRL to be included in the System Location Tag.

NID_RANGE specifies the number of consecutive NIDs following NID_START within the cdma2000 PRL. Therefore, the last NID value specified by NID_RANGE shall be equal to NID_START+NID_RANGE. If only one NID value is specified (i.e., NID_START), the NID OFFSET shall be set to '00000000'.

If SYS_TYPE is set to '00000001' (GSM/UMTS/LTE), the SYS_LOC_TAG can consist of the following fields:

TABLE G

| GSM/UMTS/LTE System Location Tag | Length in bytes |
|---|---|
| PLMN_START | 3 |
| PLMN_RANGE | 1 |

PLMN_START specifies the first PLMN value from the GSM/UMTS/LTE PLMN Selector List to be included in the System Location Tag.

PLMN_RANGE specifies the number of consecutive PLMNs following PLMN_START within the PLMN Selector List. Therefore, the last PLMN value specified by PLMN_RANGE shall be equal to PLMN_START+PLMN_RANGE. If only one PLMN value is specified (i.e., PLMN_START), the PLMN_OFFSET can be set to '00000000'.

MSPL_INDEX is the MMSS System Priority List Index. This field is set to the MSPL_ID of the MMSS System Priority List corresponding to an MLPL entry.

MMSS System Priority List (MSPL) is a prioritized list of cdma2000 and non-cdma2000 cellular systems. The MSPL assists a multi-mode mobile station in selecting a system. Once a system is selected, the mobile station follows the standard network selection procedures for the selected system to acquire a network.

Network priorities of systems within a standard (e.g. 3GPP, 3GPP2) are can be dictated by the rules of that standard. In case there is a conflict between MMSS and the system priorities of another standard, the priorities of that standard shall take precedence. MMSS shall be used only to identify cross-standard system priorities and priorities of radio access technologies (RATs) within the same standard when RAT is unspecified. For example, if a terminal is in GSM mode, then MMSS can point the terminal to a system of a non-3GPP standard or another 3GPP RAT (e.g. LTE) of the same PLMN when the PLMN entry does not specify the RAT. The latter occurs for a single entry when no RAT is specified or when two or more RATs are indicated. Note that the provisioning of the MSPL table should be consistent with the system selection rules of the underlying individual systems.

The MSPL can apply to the subset of networks defined by the group of MLPLs with a common MLPL_GROUPING_ID which indexes the MSPL. For example, for a group of MLPLs with a common MLPL_GROUPING_ID each with a single distinct MCC, the MSPL (which each MLPL in the group points to) applies to only those networks in the underlying standard associated with each of the MCCs specified by this group of MLPLs.

The relative priorities between all system entries of each standard should be defined to avoid any ambiguity of the relative priorities—such that no relative system priorities are left undefined.

There can be one or more MSPLs in the MS. The MSPL can be sent to the mobile station over-the-Air. The MSPL is retained by the mobile station when power is turned off. There shall be only one MSPL associated with a location grouping in the MLPL. The MSPL can consist of the following fields:

TABLE H

| System Type | Value |
|---|---|
| cdma2000 | 00000000 |
| GSM/UMTS/LTE | 00000001 |
| WiMAX | 00000010 |
| 1x | 00000011 |
| HRPD | 00000100 |
| GERAN (GSM) | 00000101 |
| UTRAN (UMTS) | 00000110 |
| EUTRAN (LTE) | 00000111 |
| Reserved for future standardization | '00001000'-'11111111' |

MULTIMODE SYSTEM SELECTION. An exemplary aspect is provided that recommends use of the MMSS Location Associated Priority List (MLPL) and the MMSS System Priority List (MSPL) for Multimode System Selection (MMSS). The MLPL and the MSPL are used together for the purposes of selecting a supported WWAN system based on the two priority lists.

The MLPL is a list of records based on location specific information. The MLPL allows the operators to specify the MMSS System Priority List to be used for a particular location record. Typically, the MLPL consists of many location records. For each location record (or, equivalently, MLPL record), one to three location parameter values (i.e., Mobile Country Code (MCC), Mobile Network Code (MNC) and SYS_LOC_TAG) may be specified along with a MSPL_INDEX which specifies the associated MSPL.

The MSPL is a list of records for prioritizing cdma2000 and non-cdma2000 cellular systems. The MSPL assists a multimode mobile station in selecting a system. Once a system is selected, the mobile station follows the network selection procedures according to the requirements of that system. There can be only one MSPL record associated with a location grouping specified in an MLPL record; however, any number of MLPL records may have the same MSPL_INDEX. The next two sections describe the MLPL and MSPL in more detail.

MMSS Location Associated Priority List (MLPL). An MLPL record may consist of one to three location parameter values: MCC, MNC and SYS_LOC_TAG. SYS_LOC_TAG is a location TAG associated with specific networks within a system. Typically, an operator will define an MLPL record for each country where there is a roaming agreement. If the priority for system selection is to be the same within any given country, then only the MCC parameter can be used to define the location parameter value. For example, if the home operator has roaming agreements with 5 countries, the MLPL may consist of the following 5 records:

TABLE I

| MLPL record | MCC | MNC | SYS_LOC_TAG | MSPL_INDEX |
|---|---|---|---|---|
| 1 | 1 | | | MSPL 1 |
| 2 | 2 | | | MSPL 2 |
| 3 | 3 | | | MSPL 3 |
| 4 | 4 | | | MSPL 4 |
| 5 | 5 | | | MSPL 4 |

Note that MNC and SYS_LOC_TAG are not needed since each country has only one system selection priority list indicated by MSPL_INDEX. Note the 4th and the 5th records are both associated with the same MSPL_INDEX (i.e., the two countries have the same order of priorities for system selection).

The MNC and SYS_LOC_TAG location parameter values are only used when multiple MSPL records are needed within a country. An MNC is unique in a given country and is issued to a specific operator. If the roaming agreements differ from one region of the country to another (e.g., due to availability of services) it may be necessary for the home operator to create two MLPL records pointing to two MSPL records.

For example, the home operator may have roaming agreements with operator A (GSM/UMTS/LTE with MNC=1) and operator B (cdma2000), but less favorable roaming agreements with operator C (GSM/UMTS/LTE with MNC=2) and operator D (cdma2000). It is further assumed that operators A and D serve one region (region 1) of the country whereas operators B and C serve another region of the same country (region 2). For region 1, the preference is for mobile stations to roam onto operator A's GSM system followed by operator D's cdma2000 system. For region 2, the preference is for operator B's cdma2000 system followed by operator C's GSM system.

Using one MSPL to set priorities between cdma2000 and GSM/UMTS/LTE is clearly insufficient due to the difference in operator's requirement for system selection. The two MLPL records using MNC may be constructed as follows:

TABLE J

| MLPL Record | MCC | MNC | SYS_LOC_TAG | MSPL_INDEX |
|---|---|---|---|---|
| 1 | 1 | 1 | | MSPL 1 |
| 2 | 1 | 2 | | MSPL 2 |

Note that the first MLPL record is associated with MNC=1 (operator A) and points to MSPL 1 (with GSM/UMTS/LTE preferred over cdma2000). The second MLPL record is associated with MNC=2 (operator C) and points to MSPL 2 (with cdma2000 preferred over GSM/UMTS/LTE). Mobile stations operating in region 1 would use the first MLPL record while mobile stations operating in region 2 would use the second MLPL record.

In some cases it may be desirable for the operator to add SYS_LOC_TAG information to the MLPL records. The SYS_LOC_TAG information for cdma2000 is defined by the SID/NID info associated with particular cdma2000 networks. However, in general, there can be more than one SYS_LOC_TAG information belonging to different systems (i.e., SYS_LOC_TAG could be associated with GSM/UMTS/LTE and WiMAX) in the same MLPL record. Using the same example as above for Operators A, B, C and D, it is further assumed that Operator B's cdma2000 system uses SID=2 and NID=25 while Operator D's cdma2000 system uses SID=5 and NID=40. In TABLE K, an MLPL with SYS_LOC_TAG is depicted:

TABLE K

| MLPL record | MCC | MNC | SYS_TYPE | SYS_LOC_TAG$_1$ | SYS_LOC_TAG$_2$ | SYS_LOC_TAG$_3$ | MSPL_INDEX |
|---|---|---|---|---|---|---|---|
| 1 | 1 | 1 | | | | | 1 |
| 2 | 1 | 2 | | | | | 2 |
| 3 | 1 | | 0 (cdma2000) | 2 (SID) | 25 (NID_START) | 0 (NID_RANGE) | 1 |
| 4 | 1 | | 0 (cdma2000) | 5 (SID) | 40 (NID_START) | 0 (NID_RANGE) | 2 |
| | | | | SYS_LOC_TAG | | | |

With the SYS_LOC_TAG information, if the mobile station were to discover the GSM/UMTS/LTE network with MNC=1 the first MLPL should be used. If the mobile station were to discover the GSM/UMTS/LTE network with MNC=2 the second MLPL should be used. If the mobile were to discover cdma2000 network with SID=2, NID=25 the third MLPL record should be used. Lastly, if the mobile station were to discover cdma2000 network with SID=5, NID=40, the fourth MLPL record should be used. Typically, not all location parameter values are applicable to every system. In this example, the GSM/UMTS/LTE system uses only the MCC and MNC location parameter values while the cdma2000 uses only the MCC and the SYS_LOC_TAG location parameter values.

Since the 1st and 3rd MLPL records in Table K have the same MCC value and they both map to the same MSPL_INDEX, the two MLPL records can be combined into one MLPL record to reduce storage space (refer to Table L). Similarly, the 2nd and 4th MLPL records can be combined to form one MLPL record. In this case the first MLPL record is used if the mobile station discovers either MNC=1 while operating on the GSM system or SID=2/NID=25 while operating on the cdma2000 system. The second MLPL record is used if the mobile station discovers either MNC=2 while operating on the GSM system or SID=5/NID=40 while operating on the cdma2000 system.

For the above example, Table K and L are equivalent. Equivalency simply means a mobile station ends up choosing the same MSPL record whether the mobile station uses the MLPL records from Table K or the MLPL records from Table L. In particular, when the mobile station operates as a GSM radio, the SYS_LOC_TAG information with SYS_TYPE='0' (cdma2000) is not applicable. Therefore, from the GSM radio's perspective, MLPL record 1 in Table L is equivalent to MLPL record 1 in Table K. Similarly, since the cdma2000 radio does not use MNC for system selection in this example, the MNC entries in Table L is not applicable to the cdma2000 radio. Therefore, from the cdma2000 radio's perspective, MLPL record 1 in Table L is equivalent to MLPL record 1 in Table K. However, if the cdma2000 radio does use MNC for system selection, Table K and Table L are not equivalent since the MNCs in Table L would not match the cdma2000's MNC values.

TABLE L

MLPL with SYS_LOC TAG

| MLPL record | MCC | MNC | SYS_TYPE | SYS_LOC_TAG$_1$ | SYS_LOC_TAG$_2$ | SYS_LOC_TAG$_3$ | MSPL_INDEX |
|---|---|---|---|---|---|---|---|
| 1 | 1 | 1 | 0 (cdma2000) | 2 (SID) | 25 (NID_START) | 0 (NID_RANGE) | 1 |
| 2 | 1 | 2 | 0 (cdma2000) | 5 (SID) | 40 (NID_START) | 0 (NID_RANGE) | 2 |
|   |   |   | ⌊_____SYS_LOC_TAG_____⌋ |  |  |  |  |

In some cases, the mobile station may have more than one MLPL record to choose from based on the location parameter values. In these cases, the MLPL record with the finest granularity is chosen first (i.e., MLPL record containing SYS_LOC_TAG information), followed by the MLPL record with lesser granularity (i.e., MLPL record containing MNC information). Finally, the MLPL record with the least level of granularity is chosen last (i.e., MLPL record containing MCC only). As an example, if the mobile station acquired a cdma2000 network with SID=5, NID=40 in MCC 1, it uses the third MLPL record in Table M since the third MLPL record has better granularity. On the other hand, if the mobile station acquired a network in MCC 1 but the network parameters do not match any of the MNC or SYS_LOC_TAG in the MLPL, then the MLPL record with only the MCC value is used.

TABLE M

MLPL with different levels of granularity

| MLPL record | MCC | MNC | SYS_TYPE | SYS_LOC_TAG | SYS_LOC_TAG | SYS_LOC_TAG | MSPL_INDEX |
|---|---|---|---|---|---|---|---|
| 1 | 1 |   |   |   |   |   | 1 |
| 2 | 1 | 1 |   |   |   |   | 2 |
| 3 | 1 | 2 | 0 (cdma2000) | 5 (SID) | 40 (NID_START) | 0 (NID_RANGE) | 3 |

MMSS System Priority List (MSPL): In addition to the system selection based on system types (i.e., SYS_TYPE), the MSPL has a number of additional parameters to assist the multimode mobile station in deciding which system to select. These additional parameters include PRI_CLASS, SYS_PRI and HIGHER_PRI_SRCH_TIME. In particular, the PRI_CLASS may be used to define system priority based on different classes of networks within a system. The PRI_CLASS parameter can take on one of 3 values ('0000'=HOME, '0001'=PREFERRED and '0010'=ANY) see section 3.5.13.4. All three fields are applicable to any of the system types listed in Table H. Since each system has its own method and format for creating a priority list or roaming list, the mapping of the PRI_CLASS to networks in the priority list or roaming list may appear different from one system to another. Examples are given below for PRI_CLASS mappings for cdma2000 and GSM/UMTS/LTE systems.

For cdma2000, assume the Preferred Roaming List (PRL) for one GEO consists of the following networks.

TABLE N

Simplified cdma2000 PRL example for one GEO

| INDEX | SID | NID | NEG/PREF | PRI | GEO |
|---|---|---|---|---|---|
| 0 | 1 | 1 | PREF | MORE | NEW |
| 1 | 3 | 40 | PREF | SAME | SAME |
| 2 | 3 | 2 | PREF | SAME | SAME |
| 3 | 3 | 15 | PREF | MORE | SAME |
| 4 | 5 | 20 | PREF | SAME | SAME |
| 5 | 5 | 75 | PREF | MORE | SAME |

Based on Table N, the following mappings of PRI_CLASS are recommended:

PRI_CLASS='HOME' maps to INDEX=0 since the first entry is the highest priority network in the GEO.

PRI_CLASS='PREFERRED' maps to INDEX=0, 1, 2 and 3 since the next three entries for SID=3 have equal priorities based on 'PRI'. The 'HOME' network represented by INDEX=0 is also included in 'PREFERRED' by definition.

PRI_CLASS='ANY' maps to any cdma2000 networks regardless of whether it's listed in the PRL or not.

GSM/UMTS/LTE uses several network lists to form the PLMN selector. Specifically, the GSM/UMTS/LTE PLMN selector may contain the Home PLMN (HPLMN) or Equivalent HPLMN (EHPLMN), User-Controlled PLMN (UPLMN), Operator-controlled PLMN (OPLMN) and the Forbidden PLMN. For example, assume the EHPLMN and the OPLMN consist of the following networks in an MCC.

TABLE O

O PLMN selector example

| EHPLMN | OPLMN | UPLMN |
|---|---|---|
| PLMN 1 | PLMN 3 | PLMN 5 |
| PLMN 2 | PLMN 4 | |

PRI_CLASS='HOME', maps to PLMN 1 and PLMN 2 since PLMN 1 and PLMN 2 both belong to the EHPLMN list.

PRI_CLASS='PREFERRED' maps to PLMNs 1, 2, 3 and 4 since the PLMNs 3 and 4 belong to the OPLMN. The 'HOME' networks represented by PLMNs 1 and 2 are also included in 'PREFERRED' by definition.

PRI_CLASS='ANY' maps to any GSM/UMTS/LTE networks regardless of whether it's listed in the PLMN selector or not. The UPLMN may also be defined under this PRI_CLASS since the operator has no control over this list.

MMSS System Priority List (MSPL) with System_Types: This section describes examples of the MSPL with System Types using specific air-interface technologies.

As a first example, consider a system prioritization based on the following using air-interface technologies:

LTE>HRPD>UMTS>1x>GSM.

The MSPL can be designed as in Table P. It is important to note that this list must be designed to be consistent with the corresponding 3GPP and 3GPP2 system priorities.

TABLE P

MSPL First Example

| SYS_TYPE | PRI_CLASS | SYS_PRI |
|---|---|---|
| 0000 0111 (LTE) | 0010 (Any) | 1 (More) |
| 0000 0100 (HRPD) | 0010 (Any) | 1 (More) |
| 0000 0110 (UMTS) | 0010 (Any) | 1 (More) |
| 0000 0011 (1x) | 0010 (Any) | 1 (More) |
| 0000 0101 (GSM) | 0010 (Any) | 0 (End) |

As a second example, consider the following multi-mode system priority list:
LTE(MCC_1 MNC_1)
>HRPD(Subnet_1)
>LTE(MCC_1, MNC_2 to MNC_3)
>HRPD(Subnet_2)
>UMTS(MCC_1, MNC_2 to MNC_3)
>1x(SID_1, NID_1)
>GSM(MCC_1, MNC_2 to MNC_3)
>cdma2000 (Any)
>GSM/UMTS/LTE(Any).

This can be realized by designing the MSPL using Table Q based on the PRL in Table R, the PLMN Selector List in Table S and MLPL Record 1 of the MLPL in Table T. MCC 1 is assumed to map to SID 1.

TABLE Q

MSPL Index 1 for Second Example

| SYS_TYPE | PRI_CLASS | SYS_PRI |
|---|---|---|
| 0000 0111 (LTE) | 0000 (Home) | 1 (More) |
| 0000 0100 (HRPD) | 0000 (Home) | 1 (More) |
| 0000 0111 (LTE) | 0001 (Home + Preferred) | 1 (More) |

TABLE Q-continued

MSPL Index 1 for Second Example

| SYS_TYPE | PRI_CLASS | SYS_PRI |
|---|---|---|
| 0000 0100 (HRPD) | 0001 (Home + Preferred) | 1 (More) |
| 0000 0101 (UMTS) | 0001 (Home + Preferred) | 1 (More) |
| 0000 0011 (1x) | 0001 (Home + Preferred_2) | 1 (More) |
| 0000 0101 (GSM) | 0001 (Home + Preferred) | 1 (More) |
| 0000 0000 (cdma2000) | 0010 (Any) | 1 (More) |
| 0000 0001 (GSM.UMTS/LTE) | 0010 (Any( ) | 0 (End) |

TABLE R

Simplified cdma2000 PRL for Second Example

| INDEX | SID | NID | Subnet ID | NEG/PREF | PRI | GEO |
|---|---|---|---|---|---|---|
| 0 | | | 1 | PREF | MORE | NEW |
| 1 | | | 2 | PREF | MORE | SAME |
| 2 | 1 | 1 | | PREF | MORE | SAME |
| 3 | 3 | 40 | | PREF | SAME | SAME |
| 4 | 3 | 2 | | PREF | SAME | SAME |
| 5 | | | 3 | PREF | SAME | SAME |
| 6 | 3 | 15 | | PREF | MORE | SAME |
| 7 | 5 | 20 | | PREF | SAME | SAME |
| 8 | 5 | 75 | | PREF | END | SAME |

TABLE S

Simplified PLMN Selector List for Second Example

| EHPLMN | OPLMN | UPLMN |
|---|---|---|
| MCC_1, MNC_1 | MCC_1, MNC_2 | MCC_1, MNC_5 |
| | MCC_1, MNC_3 | MCC_1, MNC_6 |
| MCC_2, MNC_1 | MCC_2, MNC_1 | MCC_2, MNC_4 |
| | MCC_2, MNC_2 | MCC_2, MNC_5 |
| | MCC_2, MNC_3 | MCC_2, MNC_6 |
| * * * | * * * | * * * |
| MCC_9, MNC_1 | MCC_9, MNC_2 | MCC_9, MNC_5 |

Here is a sample MLPL Table T which describes the usage of MLPL_GROUPING_ID.

MLPL Record 1 points to MSPL 1. MSPL 1 applies to the subset of PLMN List entries with MCC 1 and GEO(s) of a PRL containing one or more entries with SID 1 equivalent to MCC 1.

MLPL Record 2 points to MSPL 2. MSPL 2 applies to the subset of PLMN List entries with MCC 2 and GEO(s) of a PRL containing one or more entries with a SID equivalent to MCC 2.

MLPL Record 3 and 4 form a group with MLPL_GROUPING_ID 3 where each points to MSPL 3. MSPL 3 applies to a subset of PLMN List entries with either MCC 3 or MCC 4 and GEO(s) of a PRL containing one or more entries with a SID equivalent to either MCC 3 or 4.

MLPL Record 5 points to MSPL 3. MSPL 3 applies to a subset of PLMN List entries with MCC 5 and GEO(s) of a PRL containing one or more entries with a SID equivalent to MCC 5.

MLPL Record 6 points to MSPL 3. MSPL 3 applies to a subset of PLMN List entries with MCC 6 and GEO(s) of a PRL containing one or more entries with a SID equivalent to MCC 6.

MLPL Record 7 points to MSPL 1. MSPL 1 applies to a subset of PLMN List entries with MCC 7 MNC 3 and GEO(s) of a PRL containing one or more entries with a SID & NID equivalent to MCC 7 MNC 3 or a SID 3 NID 1.

MLPL Record 8 and 9 form a group with MLPL_GROUPING_ID 7 where each points to MSPL 2. MSPL 2 applies to a subset of PLMN List entries from PLMN 8 including the 4 next consecutive entries and GEO of a PRL with SID 9 and NID 3 to NID 7 inclusive.

TABLE T

MLPL with MLPL_GROUPING_ID for Second Example

| MLPL Record Index | MLPL_GROUPING_ID | MCC | MNC | SYS_TYPE | SYS_LOC_TAG₁ | SYS_LOC_TAG₂ | SYS_LOC_TAG₃ | MSPL_INDEX |
|---|---|---|---|---|---|---|---|---|
| 1 | 1 | 1 | | | | | | 1 |
| 2 | 2 | 2 | | | | | | 2 |
| 3 | 3 | 3 | | | | | | 3 |
| 4 | 3 | 4 | | | | | | 3 |
| 5 | 4 | 5 | | | | | | 3 |
| 6 | 5 | 6 | | | | | | 3 |
| 7 | 6 | 7 | 3 | 0 (cdma2000) | 3 (SID) | 1 (NID_START) | 0 (NID_RANGE) | 1 |
| 8 | 7 | | | 1 (3GPP) | 8 (PLMN_START) | 4 (PLMN_RANGE) | | 2 |
| 9 | 7 | | | 0 (cdma2000) | 9 (SID) | 3 (NID_START) | 4 (NID_RANGE) | 2 |

Figure 2:
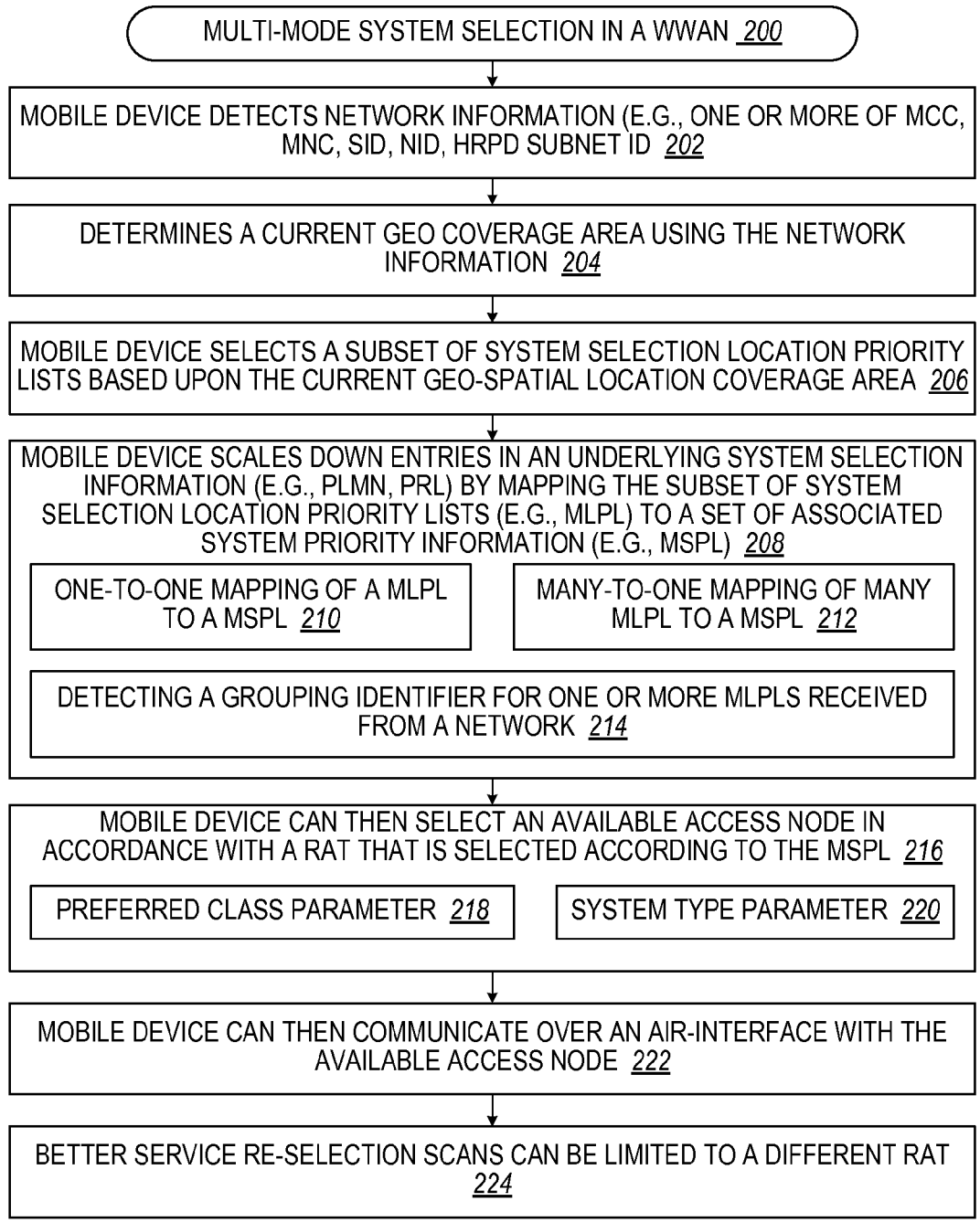
FIG. 2 illustrates a flow diagram for a methodology or sequence of operations for MMSS in a wireless wide area network (WWAN).

In FIG. 2, a methodology or sequence of operations 200 is depicted for multi-mode system selection in a wireless wide area network. A mobile device detects network information (e.g., one or more of MCC, SID, NID, and HRPD Subnet ID (block 202). The mobile device determines a current geo-spatial location (GEO) coverage region using the network information (block 204). The mobile device selects a subset of system selection location priority lists based upon the current geo-spatial location coverage region (block 206). The mobile device scales down entries in underlying system selection information (e.g., PLMN, PRL) by mapping the subset of system selection location priority lists (e.g., MLPL) to a set of associated system priority information (e.g., MSPL) (block 208). For example, the mapping can be one-to-one mapping of a MLPL to a MSPL (block 210). For another example, the mapping can be many-to-one mapping of a MLPL to MSPL (block 212). The mapping can be by detecting a grouping identifier for one or more MLPLs received from a network (block 214). The mobile device can then select an available access node in accordance with a radio access technology that is selected according to the system selection priority list (block 216). The scaling and mapping can be achieved with reference to a preferred class parameter of radio access technologies contained in the MSPL (block 218). The scaling and mapping can be achieved with reference to a system type parameter of radio access technologies contained in the MSPL (block 220). The mobile device can then communicate over an air-interface with the available access node (block 222). In some instances, better service re-selection scans can be limited to a different radio access technology (block 224).

Figure 3:
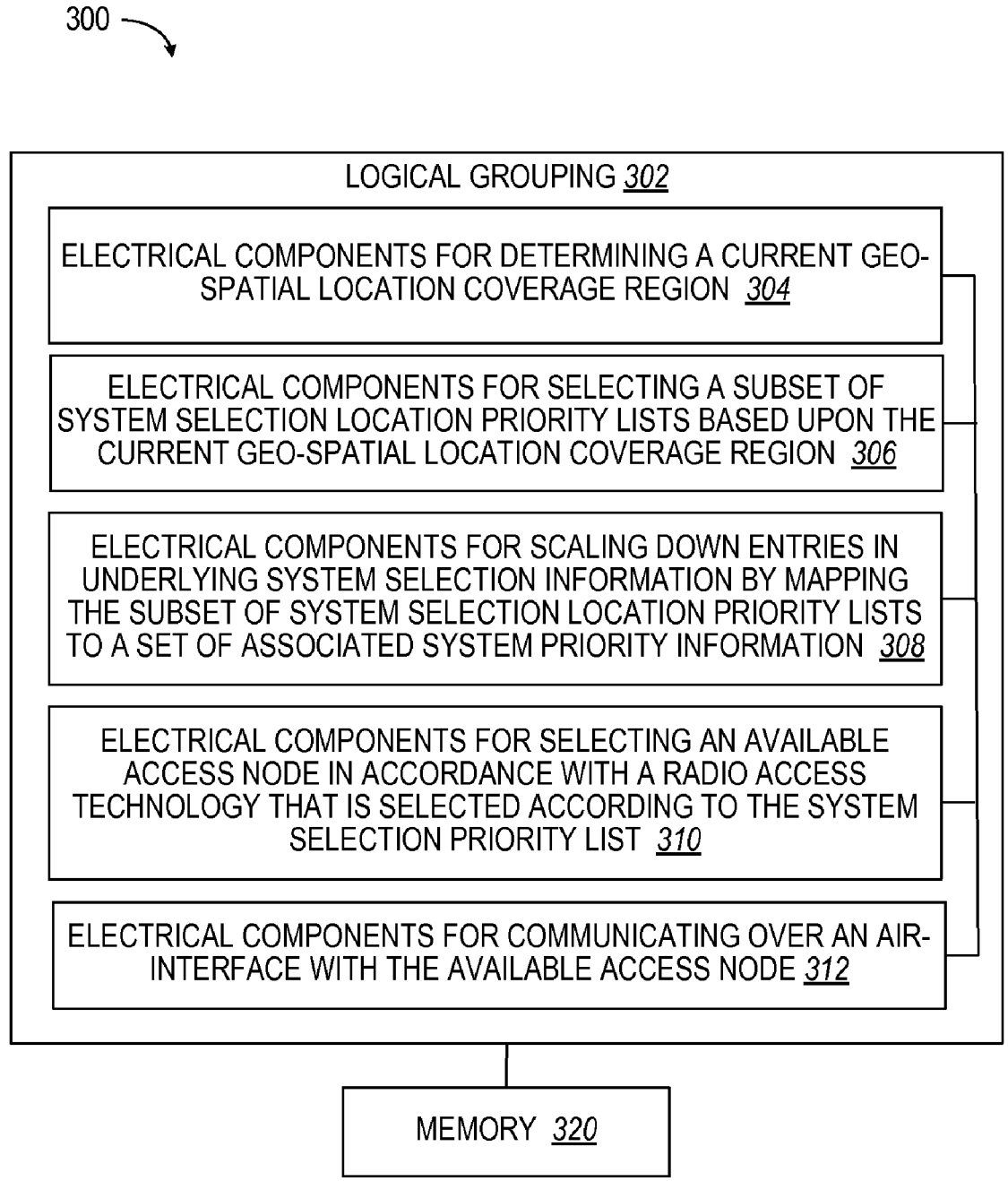
FIG. 3 illustrates a schematic diagram for a system including logical groupings of electrical components for MMSS.

With reference to FIG. 3, illustrated is a system 300 for multi-mode system selection in a wireless wide area network. For example, system 300 can reside at least partially within a mobile device, access terminal or user equipment. It is to be appreciated that system 300 is represented as including functional blocks, which can be functional blocks that represent functions implemented by a computing platform, processor, software, or combination thereof (e.g., firmware). System 300 includes a logical grouping 302 of electrical components that can act in conjunction. For another instance, logical grouping 302 can include an electrical component for determining a current geo-spatial location coverage region 304. For another instance, logical grouping 302 can include an electrical component for selecting a subset of system selection location priority lists based upon the current geo-spatial location coverage region 306. Moreover, logical grouping 302 can include an electrical component for scaling down entries in underlying system selection information by mapping the subset of system selection location priority lists to a set of associated system priority information 308. In addition, logical grouping 302 can include an electrical component for communicating over an air-interface with the available access node 310. In addition, logical grouping 302 can include an electrical component for selecting an available access node in accordance with a radio access technology that is selected according to the system selection priority list 312. Additionally, system 300 can include a memory 320 that retains instructions for executing functions associated with electrical components 304-312. While shown as being external to memory 320, it is to be understood that one or more of electrical components 304-312 can exist within memory 320.

Figure 4:
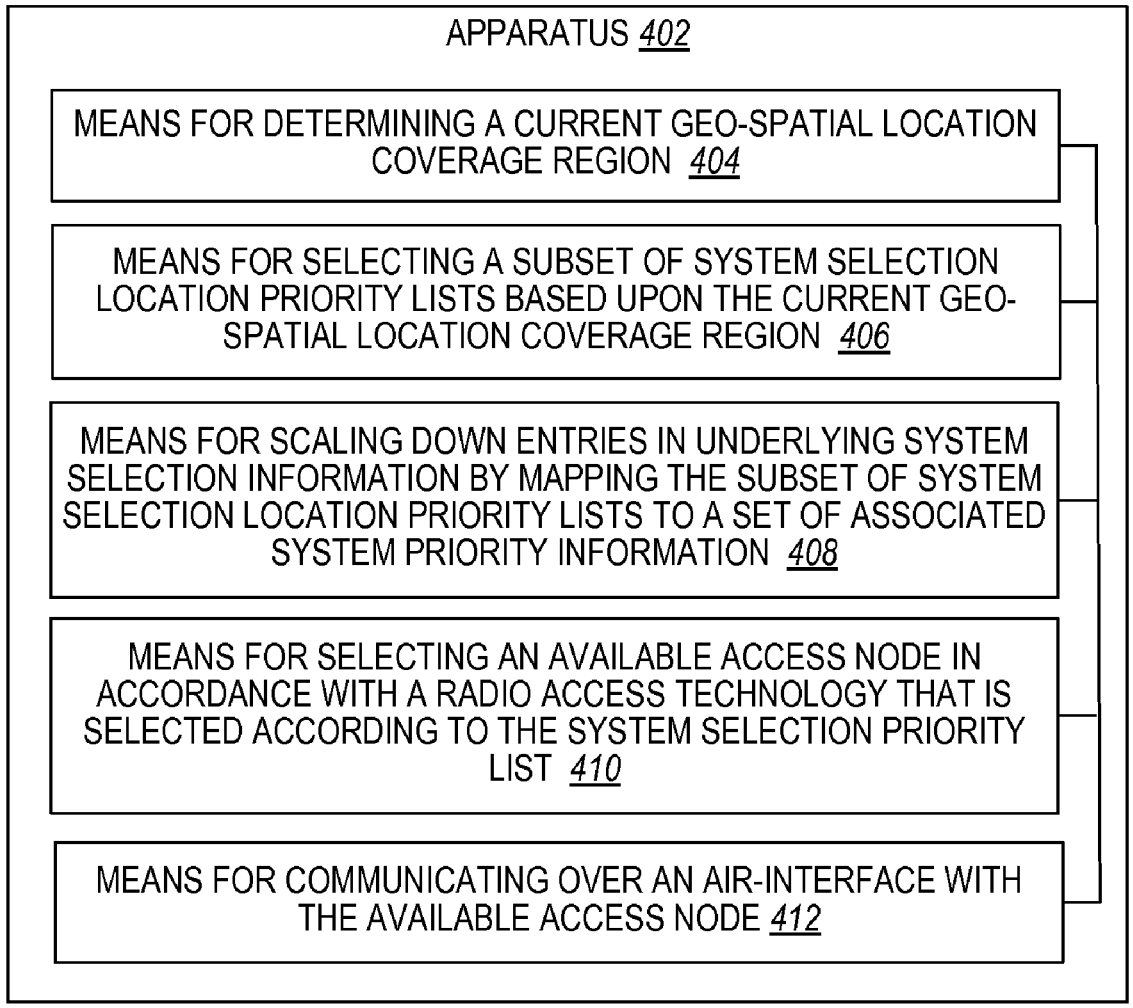
FIG. 4 illustrates a schematic diagram for an apparatus having means for MMSS.

In FIG. 4, an apparatus 402 is depicted for multi-mode system selection in a wireless wide area network. Means 404 are provided for determining a current geo-spatial location coverage region. Means 406 are provided for selecting a subset of system selection location priority lists based upon the current geo-spatial location coverage region. Means 408 are provided for scaling down entries in underlying system selection information by mapping the subset of system selection location priority lists to a set of associated system priority information. Means 410 are provided for selecting an available access node in accordance with a radio access technology that is selected according to the system selection priority list. Means 412 are provided for communicating over an air-interface with the available access node.

Figure 5:
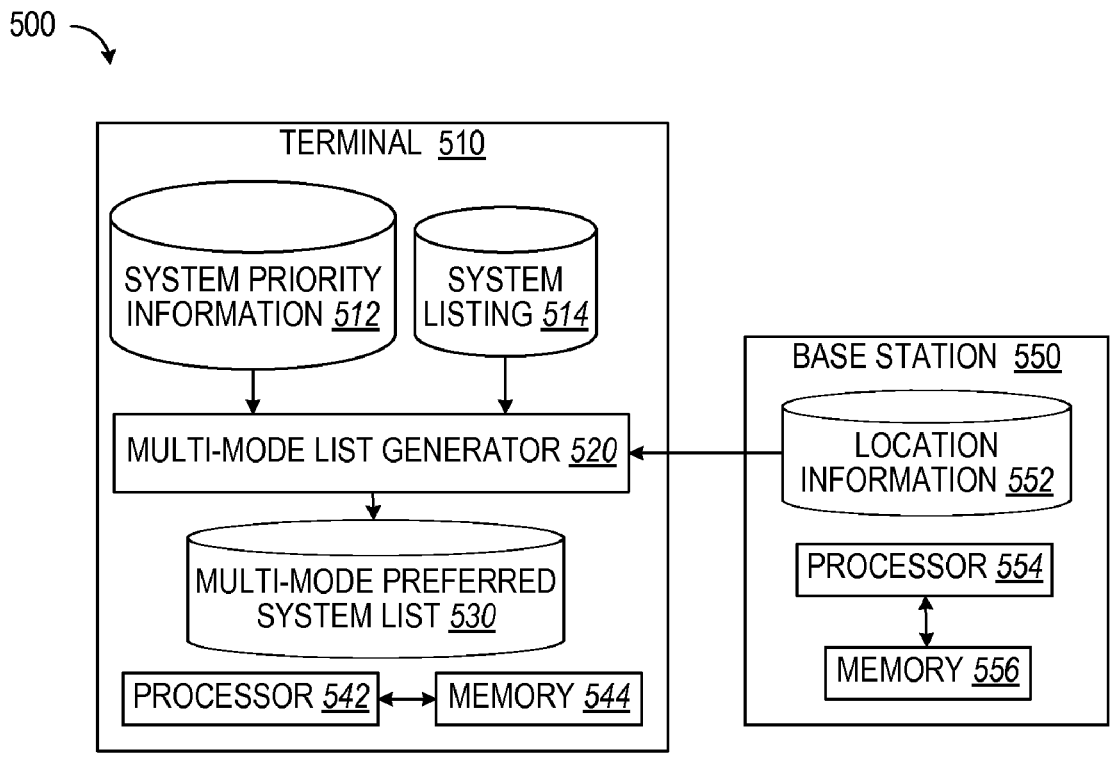
FIG. 5 is a block diagram of a system that facilitates preferred system selection in a multi-mode wireless communication system.

FIG. 5 illustrates a system 500 that facilitates preferred system selection in a multi-mode wireless communication system in accordance with various aspects described herein. As FIG. 5 illustrates, system 500 can include one or more terminals (e.g., access terminals (ATs), mobile terminals, user equipment units (UEs), etc.) 510, which can interact with one or more base stations (e.g., access points (APs), Node Bs, Evolved Node Bs (eNBs), etc.) 550. In one example, base station 550 can engage in one or more downlink (DL, also referred to as forward link (FL)) communications with terminal 510, and terminal 510 can engage in one or more uplink (UL, also referred to as reverse link (RL)) communications with base station 550.

In accordance with one aspect, an area corresponding to system 500 can be served by multiple base stations 550, each of which can provide communication functionality under one or more radio access technologies (RATs). These radio access technologies can include one or more technologies created by various standards organizations. By way of specific example, radio technologies in use in a given geographic area can be implemented in accordance with 3GPP standards such as GSM, General Packet Radio Service (GPRS), Enhanced Data Rates for GSM Evolution (EDGE), UMTS, LTE, or the like; 3GPP2 standards such as IS-95, CDMA2000 (e.g., 1×, Evolution-Data Optimized (EV-DO), etc.), UMB, or the like; IEEE standards such as Wi-Fi, WiMAX, etc.; and/or any other suitable standards In one example, terminal 510 can be capable of multi-mode operation in order to facilitate versatile use of multiple radio access technologies implemented by one or more standards organizations. Multi-mode terminals can be utilized, for example, by a network operator that utilizes multiple networks based on respective disparate air interface technologies. For example, multi-mode terminals can be supported by a network operator that updates a portion of network infrastructure to utilize a new radio access technology but still desires respective terminals to be able to utilize older, legacy portions of the network for increased versatility in different geographical areas and/or network environments.

In accordance with one aspect, a terminal 510 capable of utilizing a variety of networks under different air interface technologies can implement one or more procedures for selecting a preferred system with which to communicate in system 500. In one example, terminal 510 can base system selection on information such as system priority information or listings 512, system listing information 514, and/or location information 552. As illustrated in FIG. 5, system priority information 512 and system listing(s) 514 can be stored locally at terminal 510 and location information can be identified from an associated base station 550; however, it should be appreciated that terminal 510 can obtain such information, and/or any other information suitable for conducting system selection, from any source within or separate from system 500. It should further be appreciated that unless explicitly stated otherwise, the claims appended hereto are not intended to limit to specific location(s) of information.

System priority information 512 and/or system listing(s) 514 can, in one example, be stored at terminal 510 as a set of databases that correspond to respective air interface technologies and/or groups of technologies that can be utilized by terminal 510. Thus, for example, different databases can be provided that correspond to 3GGP technologies, 3GGP2 technologies, IEEE technologies, and/or any other suitable groups of technologies. Such databases can be stored at terminal 510 via a Subscriber Identity Module (SIM) card, a memory, and/or other machine-readable data storage such as a hard disk, memory card, CD-ROM disc, or the like.

In accordance with one aspect, in the event that different databases are utilized by terminal 510, such databases may utilize different, non-overlapping subsets of information, be formatted in different manners, and/or differ in one or more other material ways. As a specific example, terminal 510 can be capable of both 3GPP and 3GPP2 system selection, such that terminal 510 stores system priority information 512 and system listings 514 corresponding to both sets of standards. However, it can be appreciated that while at a high level each set of information 512 and 514 for the respective sets of standards specify priority ordering for selecting a system based on operator, access technology, and/or other information, the low-level designs of such information 512 and 514 for 3GPP and 3GPP2 operation can differ significantly. For example, a system listing 514 for 3GPP may be a very coarse listing, providing only Mobile Country Code (MCC)/Mobile Network Code (MNC) information corresponding to respective 3GPP systems, while system listing for 3GPP2 may be a more comprehensive list that includes system identifiers (SIDs), network identifiers (NIDs), radio frequency (RF) band-class and/or channel information, acquisition type information, or the like. Further, formatting of system listings 514 and/or priority information 512 may be different in that 3GPP priority information may consist solely of a listing of systems ordered by priority for respective countries (e.g., as specified by corresponding MCCs) and/or other similar areas, while 3GPP2 priority information may be formatted to enable various systems to share priority levels and/or to provide subsets of the priority listing for substantially tighter areas such as geo-spatial locations (GEOs). Accordingly, based on the differences in system priority information 512 and system listings 514 for various technologies and/or groups of technologies, a terminal 510 desiring to create a preferred list of multi-mode systems for one or more locations can encounter difficulty in doing so given individual and separate lists for each mode and/or standard utilized.

Thus, in accordance with one aspect, terminal 500 can include a multi-mode list generator 520, which can synthesize system priority information 512 and system listings 514 corresponding to multiple different standards and/or air interface technologies to generate a single multi-mode preferred system list 530, which can be utilized by terminal 510 to select a system with which to communicate in system 500. By way of specific example, terminal 510 can be capable of operation under one or more 3GPP standards (e.g., LTE), one or more 3GPP2 standards (e.g., CDMA2000), and/or other suitable standards. Based on system priority information 512 and system listings 514 corresponding to such standards, along with location information 552 that relates to one or more geographic locations, terminal 510 can utilize multi-mode list generator 520 to generate a multi-mode preferred system list 530, thereby providing terminal 510 with the capability to find a communication network using any communication technology supported by terminal 510 in one or more locations provided by location information 552.

In one example, multi-mode list generator 520 can generate a multi-mode preferred system list 530 in a versatile manner by incorporating finely granular information provided in given information while still providing support for coarser sets of information. Specific techniques for creating a multi-mode preferred system list are provided in further detail infra.

In another example, location information 552 can correspond to a current location of terminal 510 within system 500. By utilizing the current location of terminal 510, multi-mode list generator 520 can provide terminal 510 with a multi-mode preferred system list 530 that includes various systems that provide coverage for the area at which terminal 510 is located. This can be accomplished, for example, by pruning one or more generalized sets of system priority information 512 and/or system listings 514 to incorporate only information relating to a location of interest for terminal 510. Various multi-mode preferred system lists 530 corresponding to respective locations can be pre-generated and pre-stored at terminal 510, or in one example a multi-mode preferred system list 530 for a particular location (e.g., city, country, etc.) can be automatically generated upon determining that terminal 510 has entered said location.

In accordance with one aspect, terminal 510 can further include a processor 542 and/or memory 544, which can be utilized to implement and/or otherwise facilitate some or all of the functionality of terminal 510 as described herein. Similarly, base station 550 can include a processor 554 and/or memory 556 for facilitating and/or implementing some or all functionality of base station 550 as described herein.

Figure 6:
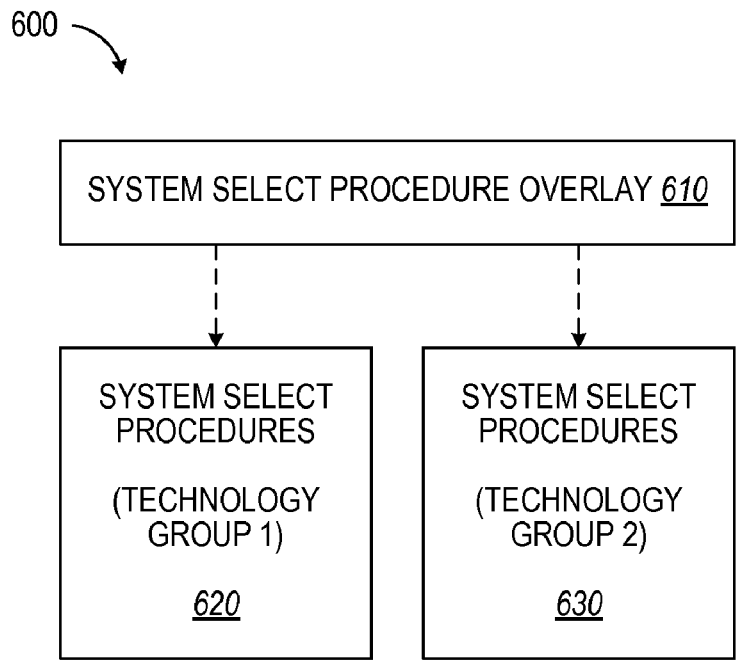
FIG. 6 illustrates an example system select procedure hierarchy that can be utilized in accordance with various aspects described herein.

Turning now to FIG. 6, a diagram 600 is provided that illustrates an example system select procedure hierarchy that can be utilized in accordance with various aspects described herein. In the example illustrated by diagram 600, a set of system select procedures 610-620 can be utilized, each of which can correspond to respective technology groups. Technology groups can correspond to, for example, RATs implemented by respective standards bodies and/or any other appropriate grouping.

In one example, a set of system select procedures 610 and/or 620 can include rules and/or databases utilized by a terminal in selecting a network that utilizes the corresponding technology group. System select procedures can be stored locally at a terminal, provided to a terminal in an on-demand manner from another associated entity, and/or obtained by a terminal in any other suitable manner. In accordance with one aspect, multiple sets of system select procedures 610-620 can be integrated using an overlay 630, which can include one or more rules or databases that are applied on top of individual system select procedures 610-620 to facilitate multi-mode operation between a plurality of technology groups.

Figure 7:
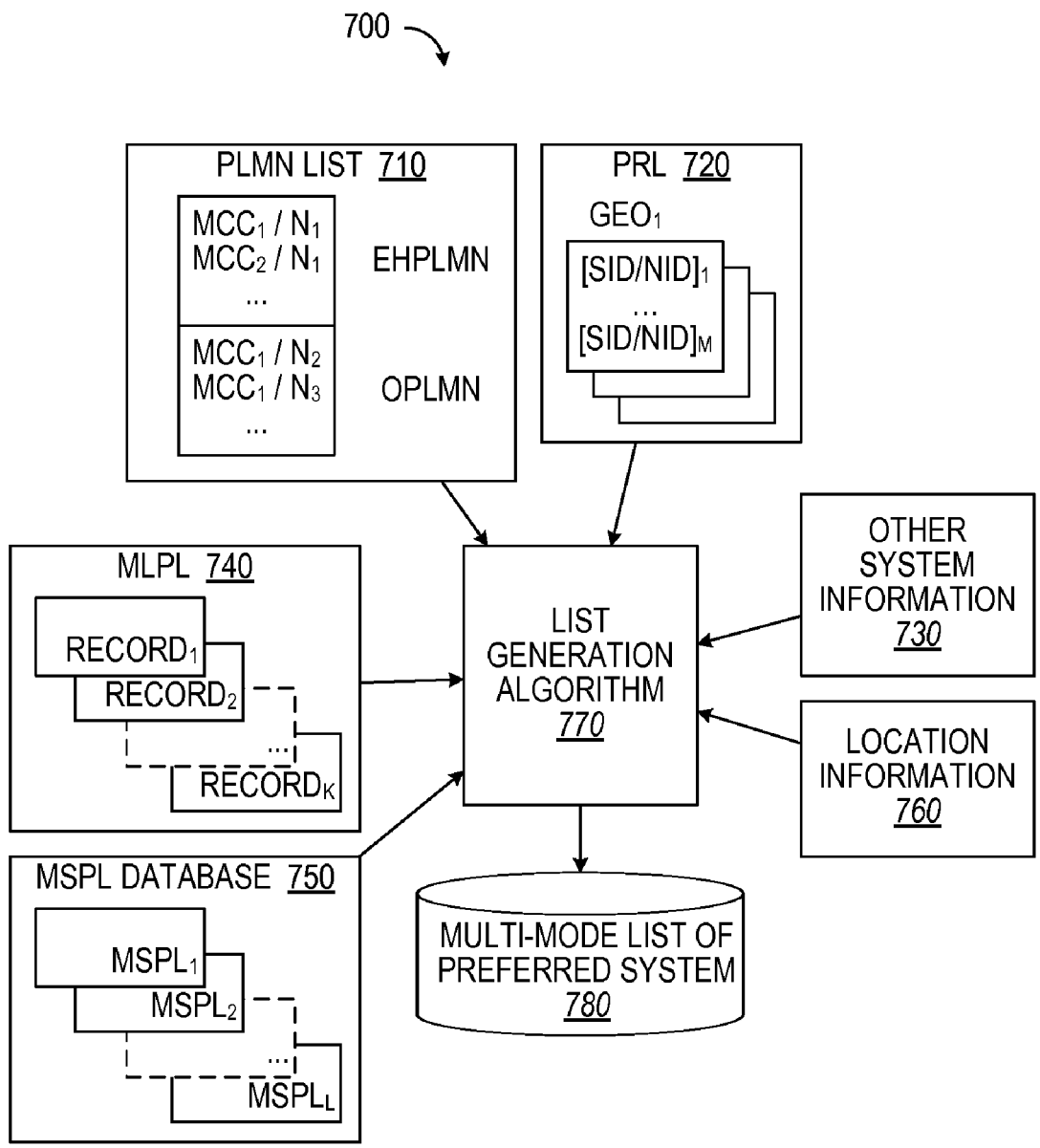
FIG. 7 is a block diagram of a system for generating a multi-mode list of preferred systems in a wireless communication environment in accordance with various aspects.

A specific, non-limiting example of a system select procedure overlay implementation, as well as a specific example of a technique for generating a multi-mode preferred system list, is illustrated by system 700 in FIG. 7. As FIG. 7 illustrates, system select information in the form of databases 710-750 can be utilized by a mobile handset and/or any other suitable device. More particularly, the databases can include a Public Land Mobile Network (PLMN) list 710, a Preferred Roaming List (PRL) 720, one or more other system information databases 730, a Multi-Mode System Selection (MMSS) Location Priority List (MLPL) 740, and a MMSS System Priority List (MSPL) database 750.

In one specific example, PLMN list 710 can include a list of PLMNs and can be configured as a small, coarse network list in order to minimize the amount of space required for its storage. For example, respective networks in PLMN list 710 can be identified using only a MCC corresponding to a country in which the network is located and a MNC corresponding to an operator of the network and placed in PLMN list 710 in decreasing order of priority. It should be appreciated, however, that PLMN list 710 can utilize any suitable formatting and/or information. As further illustrated, PLMN list 710 can be constructed using an Equivalent Home PLMN (EHPLMN) list, which can specify networks classified as home networks, an Operator PLMN (OPLMN) list, which can specify one or more preferred networks, and/or any other suitable lists.

In another specific example, PRL 720 can include a list of systems identified by respective SIDs and/or NIDs. In contrast to PLMN list 710, PRL 720 can be a more granular, detailed list that favors detail of information over storage space requirements. Accordingly, in addition to SID/NID and RAT information, PRL 720 can additionally contain information such as RF band-class and/or channel information, acquisition type information, and/or other information relating to respective systems. Further, PRL 720 can include priority level information that can enable multiple systems to share the same priority level. As further illustrated in FIG. 7, PRL 720 can be grouped into smaller lists for systems located in common geo-spatial locations or GEOs, which can correspond to cities, states, and/or other geographic regions.

Thus, in accordance with one aspect, it can be appreciated that PLMN list 710 and PRL 720 can provide system select procedures for a mobile handset for various radio technologies in a similar manner to system select procedures 610 and 620 in FIG. 6. As system 700 further illustrates, one or more other sets 730 of system select procedures may also be utilized.

In accordance with another aspect, a system select procedure overlay similar to that illustrated in FIG. 6 can be provided in system 700 by way of a MLPL 740 and a MSPL database 750. In one example, MLPL 740 can contain a set of MLPL records, each of which can identify at least one system. In one example, MLPL 740 can include records for systems listed in PLMN list 710, PRL 720, other system information 730, and/or any other suitable listings. Further, each record in MLPL 740 can point to a MSPL in a MSPL database 750. In one example, respective MSPLs in MSPL database 750 can provide rules that specify a priority listing of the systems that point to it.

Figure 8:
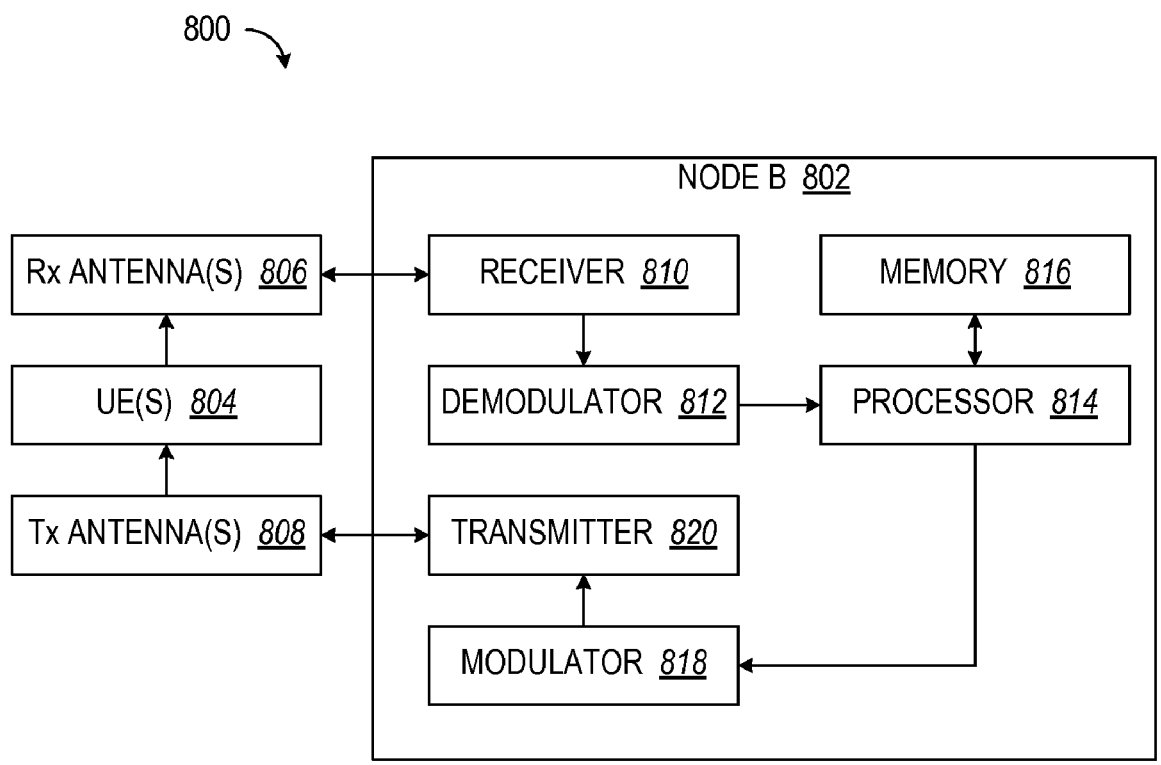
FIG. 8 illustrates an example structure that can be utilized for priority listing information in accordance with various aspects.

FIG. 8 is a block diagram of a system 800 that can be utilized to implement various aspects of the functionality described herein. In one example, system 800 includes a base station or Node B 802. As illustrated, Node B 802 can receive signal(s) from one or more UEs 804 via one or more receive (Rx) antennas 806 and transmit to the one or more UEs 804 via one or more transmit (Tx) antennas 808. Additionally, Node B 802 can comprise a receiver 810 that receives information from receive antenna(s) 806. In one example, the receiver 810 can be operatively associated with a demodulator 812 that demodulates received information. Demodulated symbols can then be analyzed by a processor 814. Processor 814 can be coupled to memory 816, which can store information related to code clusters, access terminal assignments, lookup tables related thereto, unique scrambling sequences, and/or other suitable types of information. In one example, Node B 802 can also include a modulator 818 that can multiplex a signal for transmission by a transmitter 820 through transmit antenna(s) 808.

Figure 9:
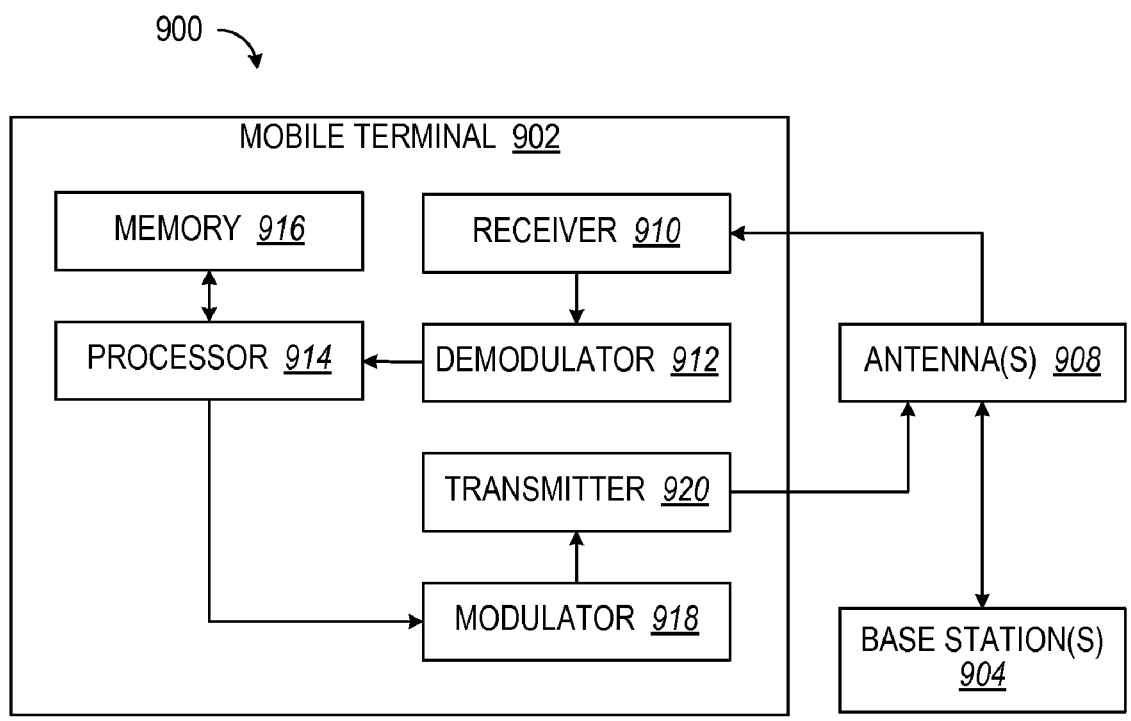
FIG. 9 illustrates an example conventional multi-mode system selection implementation.

FIG. 9 is a block diagram of another system 900 that can be utilized to implement various aspects of the functionality described herein. In one example, system 900 includes a mobile terminal 902. As illustrated, mobile terminal 902 can receive signal(s) from one or more base stations 904 and transmit to the one or more base stations 904 via one or more antennas 908. Additionally, mobile terminal 902 can comprise a receiver 910 that receives information from antenna(s) 908. In one example, receiver 910 can be operatively associated with a demodulator 912 that demodulates received information. Demodulated symbols can then be analyzed by a processor 914. Processor 914 can be coupled to memory 916, which can store data and/or program codes related to mobile terminal 902. Additionally, mobile terminal 902 can employ processor 914 to perform methodologies 900-1300 and/or other similar and appropriate methodologies. Mobile terminal 902 can also include a modulator 918 that can multiplex a signal for transmission by a transmitter 920 through antenna(s) 908.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). As an access terminal ("AT") moves through such a network, the access terminal may be served in certain locations by access nodes ("ANs") that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB, Home eNodeB, access point base station, femto cell, and so on.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

Figure 10:
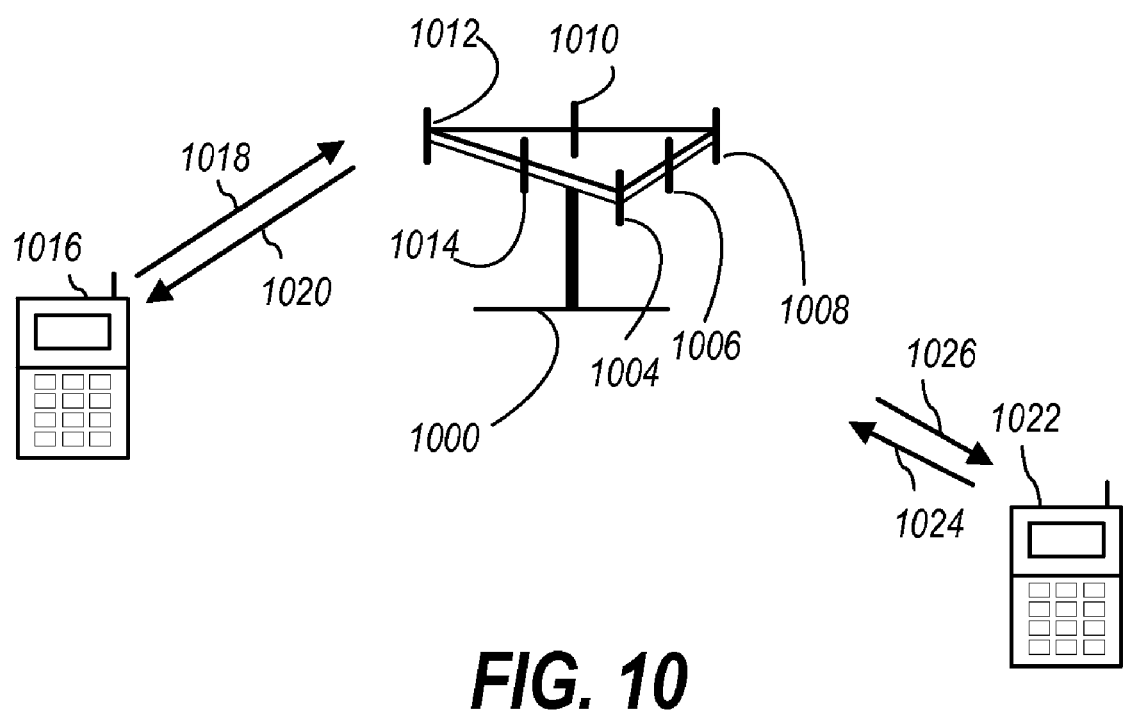
FIG. 10 illustrates a schematic diagram of a multiple access wireless communication system.

Referring to FIG. 10, a multiple access wireless communication system according to one aspect is illustrated. An access point (AP) 1000 includes multiple antenna groups, one including 1005 and 1006, another including 1008 and 1010, and an additional including 1012 and 1014. In FIG. 10, only two antennas are shown for each antenna group, however, more or fewer antennas may be utilized for each antenna group. Access terminal (AT) 1016 is in communication with antennas 1012 and 1014, where antennas 1012 and 1014 transmit information to access terminal 1016 over forward link 1020 and receive information from access terminal 1016 over reverse link 1018. Access terminal 1022 is in communication with antennas 1006 and 1008, where antennas 1006 and 1008 transmit information to access terminal 1022 over forward link 1026 and receive information from access terminal 1022 over reverse link 1024. In a FDD system, communication links 1018, 1020, 1024 and 1026 may use different frequencies for communication. For example, forward link 1020 may use a different frequency then that used by reverse link 1018.

Each group of antennas and/or the area in which they are designed to communicate is often referred to as a sector of the access point. In the aspect, antenna groups each are designed to communicate to access terminals in a sector, of the areas covered by access point 1000.

In communication over forward links 1020 and 1026, the transmitting antennas of access point 1000 utilize beamforming in order to improve the signal-to-noise ratio of forward links for the different access terminals 1016 and 1022. Also, an access point using beamforming to transmit to access terminals scattered randomly through its coverage causes less interference to access terminals in neighboring cells than an access point transmitting through a single antenna to all of its access terminals.

An access point may be a fixed station used for communicating with the terminals and may also be referred to as an access point, a Node B, or some other terminology. An access terminal may also be called user equipment (UE), a wireless communication device, terminal, or some other terminology.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for multi-mode system selection in a wireless wide area network, comprising:
    determining a current geo-spatial location coverage region;
    selecting a subset of system selection location priority lists based upon the current geo-spatial location coverage region;
    scaling down entries in underlying system selection information by mapping the subset of system selection location priority lists to a set of associated system priority information;
    selecting an available access node in accordance with a radio access technology that is selected according to the system selection priority list; and
    communicating over an air-interface with the available access node.

2. The method of claim 1, wherein scaling down entries in the underlying system selection information further comprises selecting a subset of preferred class parameters of radio access technologies contained in the associated system priority information.

3. The method of claim 1, wherein scaling down entries in the underlying system selection information further comprises selecting a subset of system type parameters of radio access technologies contained in the associated system priority information.

4. The method of claim 1, wherein the set of associated system priority information comprises at least one Multi-Mode System Selection (MMSS) System Priority List (MSPL) that includes system priority rules for one or more system types and at least one MMSS Location Priority List (MLPL) that relates a communication system to a corresponding MSPL.

5. The method of claim 2, wherein the underlying system selection information comprises a Public Land Mobile Network (PLMN) list and a Preferred Roaming List (PRL).

6. The method of claim 5, wherein the PLMN list comprises an Equivalent Home PLMN (EHPLMN) list and an Operator PLMN (OPLMN) list and the EHPLMN list and OPLMN list respectively comprise records of systems identified by Mobile Country Code (MCC) and Mobile Network Code (MNC).

7. The method of claim 1, wherein determining the current geo-spatial location coverage region further comprises determining a Mobile Country Code (MCC).

8. The method of claim 7, wherein determining the Mobile Country Code (MCC) further comprises determining a System Identifier (SID) mapped to the MCC.

9. The method of claim 1, wherein determining the current geo-spatial location coverage region further comprises detecting a plurality of network information selected from a group consisting of Mobile Country Code (MCC), System Identifier (SID), Network Identifier (NID) and Subnet Identifier.

10. The method of claim 1, wherein determining the current geo-spatial location coverage region further comprises detecting a plurality of network information selected from a group consisting of Mobile Country Code (MCC), Mobile Network Code (MNC), System Identifier (SID), Network Identifier (NID) and Subnet Identifier.

11. The method of claim 1, wherein mapping the subset of system selection location priority lists to the set of associated system priority information further comprises one-to-one mapping of a Multi-Mode System Selection (MMSS) Location Priority List (MLPL) to a MMSS System Priority List (MSPL).

12. The method of claim 1, wherein mapping the subset of system selection location priority lists to the set of associated system priority information further comprises many-to-one mapping of a plurality of entries in a Multi-Mode System Selection (MMSS) Location Priority List (MLPL) to a MMSS System Priority List (MSPL).

13. The method of claim 1, wherein determining the current geo-spatial location coverage region further comprises detecting a grouping identifier for a Multi-Mode System Selection (MMSS) Location Priority Lists (MLPLs) from a network.

14. The method of claim 13, wherein detecting the grouping identifier further comprises identifying one MLPL.

15. The method of claim 1, wherein determining the current geo-spatial location coverage region further comprises detecting one of a plurality of combinations of system information.

16. The method of claim 15, wherein detecting one of a plurality of network information further comprises detecting network information selected from a group consisting of Mobile Country Code (MCC), Mobile Network Code (MNC), System Identifier (SID), Network Identifier (NID) and Subnet Identifier.

17. The method of claim 1, further comprising limiting periodic better service re-selection scans to a different radio access technology.

18. At least one processor for multi-mode system selection in a wireless wide area network, comprising:
a first module for determining a current geo-spatial location coverage region;
a second module for selecting a subset of system selection location priority lists based upon the current geo-spatial location coverage region;
a third module for scaling down entries in underlying system selection information by mapping the subset of system selection location priority lists to a set of associated system priority information;
a fourth module for selecting an available access node in accordance with a radio access technology that is selected according to the system selection priority list; and
a fifth module for communicating over an air-interface with the available access node.

19. A computer program product for multi-mode system selection in a wireless wide area network, comprising:
a non-transitory computer-readable medium storing sets of codes:
a first set of codes for causing a computer to determine a current geo-spatial location coverage region;
a second set of codes for causing the computer to select a subset of system selection location priority lists based upon the current geo-spatial location coverage region;
a third set of codes for causing the computer to scale down entries in underlying system selection information by mapping the subset of system selection location priority lists to a set of associated system priority information;
a fourth set of codes for causing the computer to select an available access node in accordance with a radio access technology that is selected according to the system selection priority list; and
a fifth set of codes for causing the computer to communicate over an air-interface with the available access node.

20. An apparatus for multi-mode system selection in a wireless wide area network, comprising:
means for determining a current geo-spatial location coverage region;
means for selecting a subset of system selection location priority lists based upon the current geo-spatial location coverage region;
means for scaling down entries in underlying system selection information by mapping the subset of system selection location priority lists to a set of associated system priority information;
means for selecting an available access node in accordance with a radio access technology that is selected according to the system selection priority list; and
means for communicating over an air-interface with the available access node.

21. An apparatus for multi-mode system selection in a wireless wide area network, comprising:
a computing platform for determining a current geo-spatial location coverage region, selecting a subset of system selection location priority lists based upon the current geo-spatial location coverage region, scaling down entries in underlying system selection information by mapping the subset of system selection location priority lists to a set of associated system priority information, and selecting an available access node in accordance with a radio access technology that is selected according to the system selection priority list; and
a transceiver for communicating over an air-interface with the available access node.

22. The apparatus of claim 21, wherein the computing platform is further for scaling down entries in the underlying system selection information by selecting a subset of preferred class parameters of radio access technologies contained in the associated system priority information.

23. The apparatus of claim 21, wherein the computing platform is further for scaling down entries in the underlying system selection information by selecting a subset of system type parameters of radio access technologies contained in the associated system priority information.

24. The apparatus of claim 21, wherein the set of associated system priority information comprises at least one Multi-Mode System Selection (MMSS) System Priority List (MSPL) that includes system priority rules for one or more system types and at least one MMSS Location Priority List (MLPL) that relates a communication system to a corresponding MSPL.

25. The apparatus of claim 24, wherein the underlying system selection information comprises a Public Land Mobile Network (PLMN) list and a Preferred Roaming List (PRL).

26. The apparatus of claim 25, wherein the PLMN list comprises an Equivalent Home PLMN (EHPLMN) list and an Operator PLMN (OPLMN) list and the EHPLMN list and OPLMN list respectively comprise records of systems identified by Mobile Country Code (MCC) and Mobile Network Code (MNC).

27. The apparatus of claim 21, wherein the computing platform is further for determining the current geo-spatial location coverage region by determining a Mobile Country Code (MCC).

28. The apparatus of claim 27, wherein the computing platform is further for determining the Mobile Country Code (MCC) by determining a System Identifier (SID) mapped to the MCC.

29. The apparatus of claim 21, wherein the computing platform is further for determining the current geo-spatial location coverage region further comprises detecting a plurality of network information selected from a group consisting of Mobile Country Code (MCC), System Identifier (SID), Network Identifier (NID) and Subnet Identifier.

30. The apparatus of claim 21, wherein the computing platform is further for determining the current geo-spatial location coverage region further comprises detecting a plurality of network information selected from a group consisting of Mobile Country Code (MCC), Mobile Network Code (MNC), System Identifier (SID), Network Identifier (NID) and Subnet Identifier.

31. The apparatus of claim 21, wherein the computing platform is further for mapping the subset of system selection location priority lists to the set of associated system priority information by one-to-one mapping of a Multi-Mode System Selection (MMSS) Location Priority List (MLPL) to a MMSS System Priority List (MSPL).

32. The apparatus of claim 21, wherein the computing platform is further for mapping the subset of system selection location priority lists to the set of associated system priority information comprises a many-to-one mapping of a plurality of entries in a Multi-Mode System Selection (MMSS) Location Priority List (MLPL) to a MMSS System Priority List (MSPL).

33. The apparatus of claim 21, wherein the computing platform is further for determining the current geo-spatial location coverage region by detecting a grouping identifier for a Multi-Mode System Selection (MMSS) Location Priority Lists (MLPLs) from a network.

34. The apparatus of claim 33, wherein the computing platform is further for detecting the grouping identifier by identifying one MLPL.

35. The apparatus of claim 21, wherein the computing platform is further for determining the current geo-spatial location coverage region further comprises detecting one of a plurality of combinations of system information.

36. The apparatus of claim 35, wherein the computing platform is further for detecting one of a plurality of network information by detecting network information selected from a group consisting of Mobile Country Code (MCC), System Identifier (SID), Network Identifier (NID) and Subnet Identifier.

37. The apparatus of claim 21, wherein the computing platform via the transceiver is further for limiting periodic better service re-selection scans to a different radio access technology.

* * * * *